United States Patent
Sonoda et al.

(10) Patent No.: US 9,909,253 B2
(45) Date of Patent: Mar. 6, 2018

(54) RANDOM MAT, SHAPED PRODUCT OF FIBER REINFORCED COMPOSITE MATERIAL, AND CARBON FIBER MAT

(71) Applicant: Teijin Limited, Osaka-shi, Osaka (JP)

(72) Inventors: Naoaki Sonoda, Matsuyama (JP); Takeru Ohki, Matsuyama (JP); Katsuyuki Hagihara, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 135 days.

(21) Appl. No.: 14/439,581

(22) PCT Filed: Jun. 25, 2014

(86) PCT No.: PCT/JP2014/066899
§ 371 (c)(1),
(2) Date: Apr. 29, 2015

(87) PCT Pub. No.: WO2014/208626
PCT Pub. Date: Dec. 31, 2014

(65) Prior Publication Data
US 2015/0292145 A1    Oct. 15, 2015

(30) Foreign Application Priority Data

Jun. 26, 2013    (JP) .................................. 2013-133867

(51) Int. Cl.
*D04H 1/72*    (2012.01)
*D04H 1/4242*    (2012.01)
(Continued)

(52) U.S. Cl.
CPC ........... *D06M 15/513* (2013.01); *C08J 5/043* (2013.01); *C08J 5/06* (2013.01); *D04H 1/4242* (2013.01);
(Continued)

(58) Field of Classification Search
CPC ............. D04H 1/72; D04H 1/54; D04H 1/732; D04H 1/60; D04H 1/4242; D06M 15/513;
(Continued)

(56) References Cited

U.S. PATENT DOCUMENTS 7,754,323 B2    7/2010   Murai et al.
2006/0258810 A1*  11/2006  Sugiura ...................... C08J 5/06
                                                            525/207
(Continued)

FOREIGN PATENT DOCUMENTS

EP    0483716 A1    5/1992
EP    2796604 A1    10/2014
(Continued)

OTHER PUBLICATIONS

Celanese Acetate. Complete textile glossary. New York, NY: Celanese Acetate. 2001.*

(Continued)

*Primary Examiner* — Frank J Vineis
(74) *Attorney, Agent, or Firm* — Banner & Witcoff, Ltd.

(57) ABSTRACT

There is provided a random mat including carbon fibers having an average fiber length of from 3 mm to 100 mm and a thermoplastic resin, wherein a fiber areal weight of the carbon fibers is from 25 to 10,000 g/m², a proportion of carbon fiber bundles (A) constituted by single carbon filaments of a critical single fiber number or more defined by the formula (1) to the total amount of fibers in the random mat is from 40 to 99 Vol %, and an average number (N) of fibers in the carbon fiber bundles (A) satisfies the formula (2):

$$\text{critical single fiber number} = 600/D \quad (1)$$

$$2.0 \times 10^5 / D^2 \leq N < 8.0 \times 10^5 / D^2 \quad (2)$$

wherein D is an average fiber diameter (μm) of carbon fibers.

11 Claims, 3 Drawing Sheets

(51) Int. Cl.
- D06M 101/40 (2006.01)
- D06M 15/513 (2006.01)
- D21H 17/55 (2006.01)
- D04H 1/54 (2012.01)
- C08J 5/04 (2006.01)
- C08J 5/06 (2006.01)
- D21H 13/50 (2006.01)
- D21H 17/53 (2006.01)
- D21H 19/72 (2006.01)
- D04H 1/60 (2006.01)
- D04H 1/732 (2012.01)
- D21H 15/02 (2006.01)

(52) U.S. Cl.
CPC .......... *D04H 1/54* (2013.01); *D04H 1/60* (2013.01); *D04H 1/72* (2013.01); *D04H 1/732* (2013.01); *D21H 13/50* (2013.01); *D21H 15/02* (2013.01); *D21H 17/53* (2013.01); *D21H 17/55* (2013.01); *D21H 19/72* (2013.01); *C08J 2369/00* (2013.01); *C08J 2377/00* (2013.01); *D06M 2101/40* (2013.01)

(58) Field of Classification Search
CPC ... D06M 2101/40; D21H 17/55; D21H 17/05; D21H 15/02; D21H 19/72; C08J 5/06; C08J 5/043; C08J 2377/00; C08J 2369/00
See application file for complete search history.

(56) References Cited

U.S. PATENT DOCUMENTS

| | | |
|---|---|---|
| 2009/0004453 A1 | 1/2009 | Murai et al. |
| 2014/0077412 A1 | 3/2014 | Taniguchi et al. |
| 2014/0080961 A1* | 3/2014 | Konagai .......... C08J 5/042 524/495 |
| 2014/0178631 A1 | 6/2014 | Taniguchi et al. |
| 2014/0186584 A1 | 7/2014 | Arakawa et al. |
| 2015/0031257 A1 | 1/2015 | Ootsubo et al. |
| 2015/0064408 A1 | 3/2015 | Taniguchi et al. |

FOREIGN PATENT DOCUMENTS

| | | |
|---|---|---|
| JP | H04-163109 A | 6/1992 |
| JP | H05-329836 A | 12/1993 |
| JP | 2009-114611 A | 5/2009 |
| JP | 2011-178891 A | 9/2011 |
| JP | JP-2011178891 A * | 9/2011 |
| JP | 2013-049749 A | 3/2013 |
| WO | 2007/097436 A1 | 8/2007 |
| WO | 2012/165418 A1 | 12/2012 |
| WO | 2013/031860 A1 | 3/2013 |
| WO | 2013/035705 A1 | 3/2013 |
| WO | 2013/094706 A1 | 6/2013 |
| WO | 2013/115337 A1 | 8/2013 |

OTHER PUBLICATIONS

Gooch, J. Encyclopedic Dictionary of Polymers, Springer New York, 2007, p. 400, DOI10.1007/978-0-387-30160-0.*
Sep. 30, 2014—International Search Report—Intl App PCT/JP2014/066899.
Sep. 30, 2014—International Written Opinion—Intl App PCT/JP2014/066899.
Jun. 9, 2016—(EP) Search Report—App 14817572.
Jun. 27, 2016—(EP) Office Action—App 14817572.

* cited by examiner

RANDOM MAT, SHAPED PRODUCT OF FIBER REINFORCED COMPOSITE MATERIAL, AND CARBON FIBER MAT

CROSS REFERENCE TO RELATED APPLICATIONS

This is a U.S. National Phase Application under 35 U.S.C. § 371 of International Application No. PCT/JP2014/066899, filed Jun. 25, 2014, which claims priority to Japanese Application 2013-133867 filed Jun. 26, 2013, the entire disclosures of which are incorporated herein by reference.

TECHNICAL FILED

The present invention relates to a random mat including a thermoplastic resin and carbon fibers and a shaped product of fiber reinforced composite material. The present invention further relates to a carbon fiber mat having high bulk density and low springback ratio.

BACKGROUND ART

Conventionally a thermosetting resin has been mainly used as a matrix resin of a fiber-reinforced composite material. However, in recent years, a fiber-reinforced composite material in which a thermoplastic resin is a matrix has been focused from the standpoints of cost, quickness and easiness of molding, recycle possibility after use, and the like. As a fiber-reinforced composite material in which a thermoplastic resin is a matrix resin, there is one utilizing a random mat. As the random mat, for example, there is a chopped strand mat in which chopped strands obtained by cutting reinforcing fiber strands that obtained by gathering and bundling from several thousands to several hundred-thousands of filaments (more exactly, single filaments) are randomly sprayed. In the chopped strand mat, reinforcing fibers are difficult to be impregnated with a thermoplastic resin, and a mechanical strength developing property when formed into a shaped product of fiber reinforced composite material (hereinafter simply referred to as a "shaped product") is low.

Patent Document 1 proposes a technology of improving impregnation ability of a thermoplastic resin into reinforcing fibers by slanting a cross-sectional shape of a chopped strand, thereby improving mechanical properties. However, mechanical strength of a shaped product obtained in this technology is not a satisfactory level.

Patent Document 2 proposes a technology of improving impregnation ability of a thermoplastic resin into reinforcing fibers by making the reinforcing fibers into a single filament form, and thereby enhancing a mechanical strength developing property.

Patent Document 3 relates to a fiber-reinforced thermoplastic resin molding material in which a non-woven material produced by wet paper-making is used as a reinforcing fiber. Conventionally, when preparing a non-woven material by a paper-making method, in order to increase dispersion property, reinforcing fibers have been opened up to a single filament form, and used as a non-woven material. However, the non-woven material obtained by a wet paper-making is very bulky, and when the non-woven material is formed into a sheet-shaped molding material, its thickness is compressed into about 1/10. As a result, there has been a problem that when molding the sheet-shaped molding material, the reinforcing fibers tend to return to an original bulky state and a sheet expands (springback). In Patent Document 3, to solve the problem of springback, a non-woven material of bundle-shaped reinforcing fibers including a plurality of single filaments and a sheet-shaped molding material containing the same are formed by, for example, performing wet paper-making using reinforcing fibers that gathered and bundled by a hydrophobic sizing agent. It is described that the non-woven material may contain reinforcing fibers in a single filament form, in addition to bundled reinforcing fibers including a plurality of single filaments.

CITATION LIST

Patent Document

Patent Document 1: JP-A-2009-114611
Patent Document 2: WO2007/097436
Patent Document 3: JP-A-4-163109

SUMMARY OF THE INVENTION

Problems that the Invention is to Solve

The present inventors have found that the technology described in Patent Document 2 above can increase a strength developing property to a composite material containing reinforcing fibers of chopped strand as described in Patent Document 1 by using a composite material containing reinforcing fibers in a single filament form, but has a problem that a molding base material (random mat and the like) including reinforcing fibers in a single filament form is liable to have very low bulk density and high molding pressure is required when molding. Particularly, in the case of such a random mat requiring high molding pressure, when a large area shaped product is molded, very large-sized facilities are required. This means that equipment investment is remarkably increased, and is an extremely disadvantageous factor when the technology is carried out commercially.

It was thought as if the problem in the technology of Patent Document 2 was solved by the technology of Patent Document 3. However, the present inventors have found that the technology as in Patent Document 3 has a problem such that since reinforcing fibers of a bundle-form structure in which single filaments are tightly gathered and bundles are used, a shaped product obtained is liable to involve decrease of appearance and decrease of mechanical properties due to poor impregnation, and it is difficult to obtain a shaped product having high fiber volume content ratio. Furthermore, the present inventors have found that the technology of Patent Document 3 has another problem that in the case of using a non-woven material including reinforcing fibers in a single filament form, the reinforcing fibers in a single filament form are liable to be broken in a treatment after wet paper-making, and it is difficult to effectively increase a bulk density.

In view of the above problems, the present invention has an object to provide a random mat including carbon fibers and a thermoplastic resin, wherein a pressure applied when molding can be reduced, and when a shaped product of fiber reinforced composite material is formed from the random mat, high fiber volume content ratio and high mechanical strength are obtained, and a shaped product of fiber reinforced composite material, obtained by molding such a random mat. The present invention further has an object to provide a carbon fiber mat having high bulk density and low springback property.

Means for Solving the Problems

To solve the above problems, the present inventors have found that in a random mat including a thermoplastic resin and carbon fibers, by satisfying specific fiber constitution, a bulk density of the random mat can be increased and a pressure applied when molding can be reduced.

That is, the present invention relates to the following [1] to [16].

[1] A random mat including carbon fibers having an average fiber length of from 3 mm to 100 mm and a thermoplastic resin, wherein a fiber areal weight of the carbon fibers is from 25 to 10,000 g/m², the proportion of carbon fiber bundles (A) constituted by single carbon filaments of a critical single fiber number or more, being defined by the formula (1), to the total amount of fibers in the random mat is from 40 to 99 Vol %, and an average number (N) of fibers in the carbon fiber bundle (A) satisfies the formula (2):

$$\text{Critical single fiber number} = 600/D \qquad (1)$$

$$2.0 \times 10^5/D^2 \leq N < 8.0 \times 10^5/D^2 \qquad (2)$$

(wherein D is an average fiber diameter (μm) of carbon fibers).

[2] The random mat described in [1], wherein an average thickness of the carbon fiber bundles (A) is 100 μm or less.
[3] The random mat described in [1] or [2], wherein an average fiber length of the carbon fibers is from 8 mm to 50 mm.
[4] The random mat described in any one of [1] to [3], wherein the proportion of the carbon fiber bundles (A) to the total amount of fibers in the random mat is from 60 Vol % to 90 Vol %.
[5] The random mat described in any one of [1] to [4], wherein an amount of the thermoplastic resin in the random mat is from 20 parts by weight to 500 parts by weight per 100 parts by weight of the carbon fibers.
[6] The random mat described in any one of [1] to [5], wherein the carbon fibers includes carbon fibers having a width of less than 0.3 mm in an amount of from 1 to 30% by weight and carbon fibers having a width of 1.5 mm or more in an amount of 10% by weight or more. [7] The random mat described in any one of [1] to [6], comprising opened carbon fibers as the carbon fibers.
[8] A shaped product of fiber reinforced composite material, obtained by molding the random mat described in any one of [1] to [7].
[9] A shaped product of fiber reinforced composite material, including carbon fibers and a thermoplastic resin and having a springback ratio of 400% or less.
[10] The shaped product of fiber reinforced composite material described in [8] or [9], wherein an amount of the thermoplastic resin is from 20 parts by weight to 500 parts by weight per 100 parts by weight of the carbon fibers.
[11] The shaped product of fiber reinforced composite material described in any one of [8] to [10], including carbon fibers having an average fiber length of from 3 mm to 100 mm and a thermoplastic resin, wherein the carbon fibers constitute a carbon fiber mat having a fiber areal weight of from 25 to 10,000 g/m², the carbon fibers in the carbon fiber mat include carbon fiber bundles (A) including single carbon filaments of a critical single fiber number or more defined by the following formula (1) in an amount of from 40 Vol % to 99 Vol %, and an average number (N) of fibers in the carbon fiber bundles (A) satisfies the formula (2):

$$\text{Critical single fiber number} = 600/D \qquad (1)$$

$$2.0 \times 10^5/D^2 \leq N < 8.0 \times 10^5/D^2 \qquad (2)$$

(wherein D is an average fiber diameter (μm) of carbon fibers).
[12] The shaped product of fiber reinforced composite material described in any one of [8] to [11], including opened carbon fibers as the carbon fibers.
[13] A carbon fiber mat in which carbon fibers having an average fiber length of from 3 mm to 100 mm constitute a mat shape having a fiber areal weight of from 25 to 10,000 g/m², wherein the carbon fibers in the carbon fiber mat include carbon fiber bundles (A) including single carbon filaments of a critical single fiber number or more defined by the following formula (1) in an amount of from 40 Vol % to 99 Vol %, and an average number (N) of single filaments in the carbon fiber bundles (A) satisfies the following formula (2):

$$\text{Critical single fiber number} = 600/D \qquad (1)$$

$$2.0 \times 10^5/D^2 \leq N < 8.0 \times 10^5/D^2 \qquad (2)$$

(wherein D is an average fiber diameter (μm) of carbon fibers).
[14] The carbon fiber mat described in [13], including opened carbon fibers as the carbon fibers.
[15] The carbon fiber mat described in [13] or [14], including carbon fibers in which carbon fibers having a single fiber number of from 5,000 to 175,000 are opened.
[16] The carbon fiber mat described in any one of [13] to [15], including carbon fibers opened by at least one method selected from the group consisting of air opening, wet paper-making and carding.

Advantageous Effect of the Invention

The random mat according to the present invention can increase a bulk density by the above fiber constitution, and as a result, can reduce a pressure applied when molding. For this reason, large-sized molding facilities are not required even though a large area shaped product of fiber reinforced composite material.

Furthermore, when the proportion of the carbon fiber bundles (A) is from 40 Vol % to 99 Vol %, carbon fiber bundles including single filaments of the number smaller than a critical single fiber number and single filaments are included in the random mat, and high mechanical strength is obtained when a shaped product of fiber reinforced composite material is formed. The random mat of the present invention can obtain a shaped product of fiber reinforced composite material in which melt flowability when molding is excellent, a thermoplastic resin and carbon fibers are homogeneously charged up to the ends and in-plane isotropy (hereinafter sometimes referred to as "isotropy" for simplicity) is high.

Furthermore, the carbon fiber mat of the present invention has low springback property and has excellent handling property when mixed with various matrixes.

DESCRIPTION OF EMBODIMENTS

[Random Mat]

Figure 1:
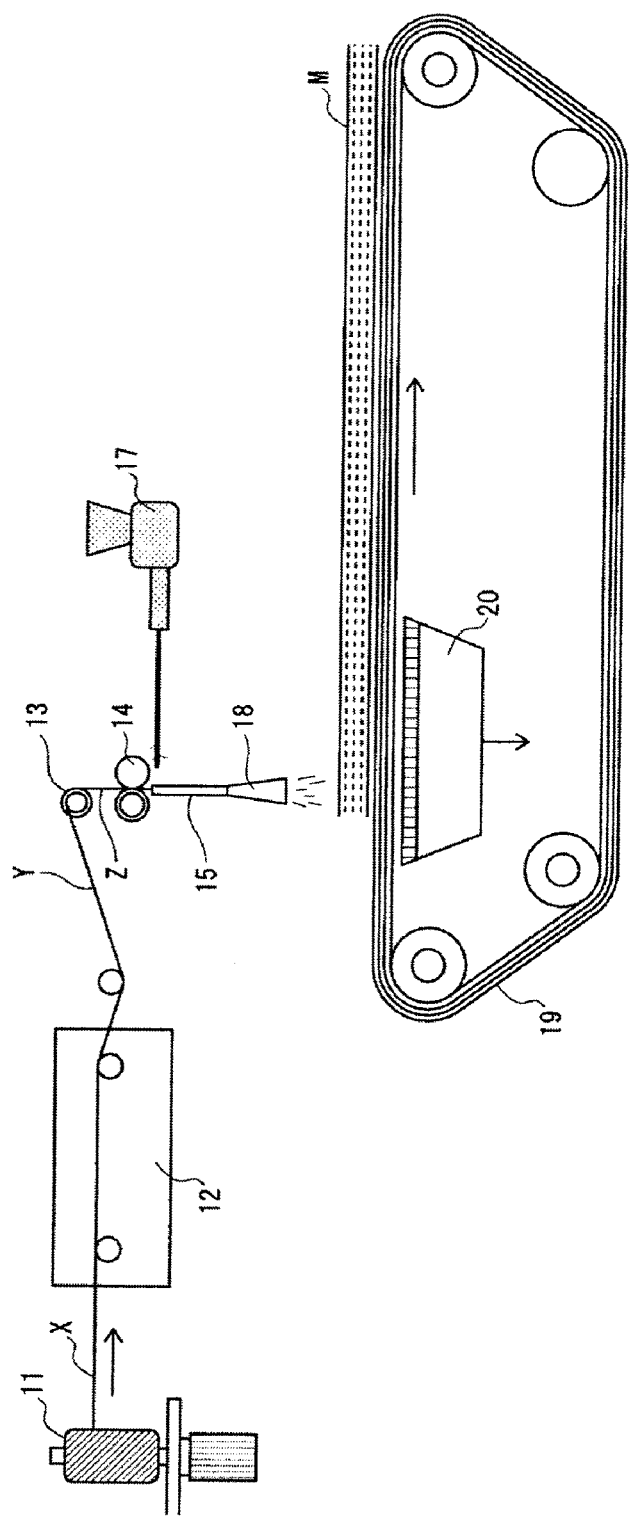
FIG. 1 is a schematic view explaining one example of a manufacturing method of a random mat.

The random mat according to the present invention is constituted by a thermoplastic resin and carbon fibers having a fiber length of from 3 mm to 100 mm, the carbon fibers have a fiber areal weight of from 25 to 10,000 g/m², a proportion of carbon fiber bundles (A) constituted by carbon filaments of a critical single fiber number or more, being defined by the formula (1), to the total amount of fibers in the random mat is from 40 Vol % to 99 Vol %, and an average number (N) of fibers in the carbon fiber bundles (A) satisfies the formula (2):

$$\text{Critical single fiber number} = 600/D \qquad (1)$$

$$2.0 \times 10^5/D^2 \leq N < 8.0 \times 10^5/D^2 \qquad (2)$$

wherein D is an average fiber diameter (μm) of carbon fibers.

Generally, "carbon fibers" have a structure that several thousands to several hundred thousands of single carbon filaments are bundled. For example, carbon fibers that are long fiber bundles constituted by such an extremely large number of single filaments and are free of twisting are called a carbon fiber tow or a carbon fiber strand.

In the present invention, the "carbon fiber bundles" mean "bundles of single carbon filaments", and are also called "carbon fibers". Similarly, the "carbon fiber bundles (A)" are also called "carbon fibers (A)".

Furthermore, the "average fiber diameter" and the "average number of fibers" are values of single carbon filaments included in the carbon fibers, and are therefore also called an "average single filament diameter" and an "average number of single filaments", respectively.

The "critical single fiber number" is also called a "critical single filament number".

The present inventors have repeatedly conducted preparations of a random mat and a shaped product of fiber reinforced composite material by changing opening conditions of carbon fibers. Also, the present inventors have considered the relationship between properties of the random mat and shaped product obtained, and the degree of opening of carbon fibers contained in those. As a result, they have found that even though bundle-form carbon fibers including a plurality of single filaments, the carbon fibers opened up to the number of single filaments is considerably decreased are that the effect of giving to the random mat and the shaped product is the same degree as that of carbon fibers in a single filament form.

Furthermore, they have been aware that a boundary value whether or not bundle-form carbon fibers may be considered so-called pseudo-single filaments has a constant relation with a diameter of single filaments, not merely the number of single filaments, and have reached a concept of the critical single fiber number defined by the formula (1).

The present inventors have further observed and analyzed various shaped products and carbon fibers included in a random mat and the like used to obtain those shaped products, and as a result, have found that when an average number (N) of single filaments in the carbon fibers (A) including single filaments of a critical single filament number or more is in a range of the formula (2) above, a random mat and a shaped product having good properties, good moldability and low springback property are formed.

That is, the random mat of the present invention is a random mat including carbon fibers having an average fiber length of from 3 mm to 100 mm, and a thermoplastic resin, and is characterized in that:

a fiber areal weight of the carbon fibers is from 25 to 10,000 g/m², carbon fibers (A) constituted by single carbon filaments of a critical single filament number or more defined by the formula (1) are contained, a proportion of the carbon fibers (A) to the total amount of the carbon fibers in the random mat is from 40 to 99 Vol %, and an average number (N) of single filaments in the carbon fibers (A) satisfies the formula (2):

$$\text{Critical single fiber number} = 600/D \qquad (1)$$

$$2.0 \times 10^5/D^2 \leq N < 8.0 \times 10^5/D^2 \qquad (2)$$

(wherein D is an average fiber diameter (μm) of carbon fibers).

The random mat is constituted by including a carbon fiber mat having a predetermined carbon fiber length, proportion of carbon fibers (A) and average number (N) of single filaments, and a thermoplastic resin, as described above. The carbon fiber mat described herein means a mat in which it is a plate-shaped body that does not contain a thermoplastic resin and is constituted by only discontinuous carbon fibers, carbon fibers are oriented in random directions in a plane on which carbon fibers are sprayed, and in-plane mechanical properties in vertical and horizontal directions are substantially equal.

As a form of the thermoplastic resin in the random mat, a powdery, fibrous or bulky thermoplastic resin may be contained in the carbon fiber mat, a sheet-shaped or film-shaped thermoplastic resin may be mounted or layered on the carbon fiber mat, and a sheet-shape or film-shaped thermoplastic resin may be a molten state.

If an average fiber length, a proportion of carbon fibers (A), an average number (N) of single filaments, and the like, of the carbon fiber mat constituting the random mat of the present invention are obtained, those values can be considered values of the random mat.

The random mat may be directly used for molding as a preform, and may be used for molding after forming into a prepreg.

A fiber areal weight of carbon fibers in the random mat is from 25 to 10,000 g/m². The fiber areal weight is preferably from 1,000 to 8,000 g/m², and more preferably from 2,000 to 6,000 g/m². When the fiber areal weight is in this range, reinforcing function when a shaped product is formed can be developed.

Particularly, in the case where the fiber areal weight is less than 25 g/m², it is difficult to obtain a random mat having carbon fibers equally sprayed. In the case where the fiber areal weight is more than 10,000 g/m², a thickness of a shaped product to be obtained is too large, and a desired lightweight shaped product is difficult to be obtained.

The random mat of the present invention can provide a shaped product by, for example, directly heating and pressuring the random mat. In this case, it is not necessary to melt-kneading a thermoplastic resin and carbon fibers. Therefore, the carbon fibers in the random mat are not cut, and a fiber length of the carbon fibers can be maintained in the shaped product. By this, for example, a shaped product having a sharp fiber length distribution (small variation of fiber length) of the carbon fibers can be obtained, and by the presence of the carbon fibers having uniform fiber length, a shaped product having homogeneous mechanical property (strength) can be obtained.

[Shaped Product of Fiber Reinforced Composite Material (Shaped Product)]

The shaped product of fiber reinforced composite material means a product molded into a final form by pressuring and heating the random mat. For example, a shaped product may be obtained by pressuring and heating the random mat as a prepreg (see Example 1 and the like), and may be obtained by pressuring and heating the random mat as a preform.

The final form mentioned herein means a form that a shaped product is not changed to have other shape and thickness by additionally heating and pressurizing (further molding) a shaped product obtained by pressurizing and heating the random mat, in order to melt the thermoplastic resin being a matrix. Therefore, since a shaped product obtained by cutting a shaped product obtained by pressuring and heating the random mat to have other shaped form or a shaped product obtained by decreasing a thickness by polishing or increasing a thickness by applying a resin or the like is not subjected to heating and pressuring, such shaped products are a shaped product of fiber reinforced composite material. The case of utilizing heat as a means of cutting or processing does not meet the heating used herein.

Furthermore, when molding the random mat to which a molten-state thermoplastic resin is supplied, in the case of molding in the state that the thermoplastic resin supplied maintains the molten state, a shaped product is obtained by molding the random mat by, for example, only applying pressure.

As the shaped product of fiber reinforced composite material, carbon fibers having an average fiber length of from 3 mm to 100 and a thermoplastic resin are contained, a fiber areal weight of the carbon fibers is from 25 to 10,000 g/m$^2$, a proportion of the carbon fibers (A) containing carbon fibers of a critical single filament number or more defined by the formula (1) to the total amount of fibers in the shaped product is from 40 Vol % to 99 Vol %, and an average number (N) of single filaments in the carbon fibers (A) satisfies the formula (2).

The thickness of the shaped product of fiber reinforced composite material is preferably adjusted to an appropriate range by controlling a fiber areal weight of the carbon fibers contained and an amount of the thermoplastic resin. The thickness of the shaped product of fiber reinforced composite material can be a thickness of, for example, from 0.2 to 100 mm. Even in shaped products having various thicknesses, properties and appearance can be made extremely good. Specifically, shaped products having a thickness of from 2.0 mm to 7.0 mm (a thickness at 25° C. if it is necessary to define extremely strictly) are used in many uses, and are therefore preferable.

The kind of the resin constituting the shaped product of fiber reinforced composite material is not particularly limited, and the resins described in the item of the thermoplastic resin of the random mat are preferably exemplified.

The shape of the shaped product of fiber reinforced composite material is not particularly limited. For example, the shaped product may have a sheet shape and a plate shape, and may have a curved surface part. The cross-section may be a T-shape, an L-shape, a U-shape, a hat-shape and a three-dimensional shape containing those.

[Carbon Fiber]

The carbon fibers contained in the random mat and shaped product of the present invention are discontinuous fibers, and its average fiber length is from 3 mm to 100 mm. When the average fiber length is in the range, development property of reinforcing function when a shaped product is formed can be enhanced.

Polyacrylonitrile-based carbon fibers (hereinafter sometimes abbreviated as PAN-based carbon fibers), petroleum pitch-based carbon fibers, coal pitch-based carbon fibers, rayon-based carbon fibers, cellulose-based carbon fibers, lignin-based carbon fibers, phenol-based carbon fibers, vapor phase growth-based carbon fibers and the like are generally known as the carbon fibers. In the present invention, any of those carbon fibers can be preferably used. PAN-based carbon fibers are particularly preferred, and those carbon fibers may be used in one kind alone and may be used as a mixture of plural kinds.

The random mat of the present invention may contain other reinforcing fibers such as glass fibers, aramid fibers, metal fibers and ceramic fibers, other than the carbon fibers.

The average fiber length of the carbon fibers is preferably from 5 mm to 60 mm, and more preferably from 8 mm to 50 mm. The average fiber length is still more preferably from 8 mm to 40 mm, and particularly preferably from 10 mm to 40 mm.

In the case where the average fiber length is shorter than 3 mm, tensile strength of fibers cannot be effectively developed, and mechanical strength of the shaped product may be impaired. In the case where the average fiber length is longer than 100 mm, the shaped product becomes difficult to have homogeneous mechanical strength. Variation of the fiber length is not particularly limited, but it is preferred to be constituted by only fibers having the above preferred range.

The average single filament diameter of the carbon fibers used in the present invention is preferably 1 mm to 50 µm, more preferably 3 mm to 12 µm, still more preferably from 5 mm to 9 µm, and extremely preferably from 5 mm to 7 mm.

The carbon fibers are preferably carbon fibers having a sizing agent attached thereto, and the amount of the sizing agent is preferably from more than 0 to 10 parts by weight per 100 parts by weight of the carbon fibers. In the present description, the term "weight" is used for convenience, but actually means mass.

The carbon fibers used in the present invention may be constituted by carbon single filaments having a nearly circular cross-section (circular cross-section type single carbon filaments), and may be carbon fibers constituted by single filaments having an elliptical cross-section (elliptical cross-section type single carbon filaments) or carbon fibers constituted by single filaments having a broad been type cross-section (broad bean cross-section type single carbon filaments).

Here, the circular cross-section type single carbon filaments are single carbon filaments having a nearly circular cross-section in which a ratio of a long diameter of a cross-section vertical to a longitudinal direction to a short diameter thereof (long diameter/short diameter) is in a range of from 1.00 to less than 1.20.

The elliptical cross-section type single carbon filaments are single carbon filaments in which a ratio of a long diameter of a cross-section vertical to a longitudinal direction to a short diameter thereof (long diameter/short diameter) is in a range of from 1.20 to 1.60.

The broad bean cross-section type single carbon filaments are single carbon fibers having a nearly elliptical shape in which a ratio of a long diameter of a cross-section vertical to a longitudinal direction to a short diameter thereof (long diameter/short diameter) is in a range of from 1.20 to 1.60 and depressed portions are formed on a peripheral surface thereof.

Carbon fibers constituted by plural kinds of single carbon filaments having different cross-sectional shape, like carbon fibers constituted by specific proportions of broad bean cross-section type single carbon filaments, elliptical cross-section type single carbon filaments and circular cross-section type single carbon filaments, as shown in JP-A-2012-188766 and the like can also be used in the present invention.

The random mat of the present invention preferably contains opened carbon fibers as the carbon fibers. A preferable opening method of carbon fibers is the same as described in the manufacturing method of the random mat.

The carbon fibers contained in the random mat of the present invention may be carbon fibers in which so-called regular tow carbon fibers having a single filament number of 24,000 or less are opened, may be carbon fibers in which large tow carbon fibers having a single filament number of from 40,000 to 175,000 are opened, and may be carbon fibers in which medium tow having a single filament number of from more than 24,000 to less than 40,000 are opened. From standpoint that the degree of opening and a fiber width distribution are preferred, the carbon fibers contained in the random mat of the present invention are preferably carbon fibers in which carbon fibers having the number of single filaments of from 5,000 to 175,000 are opened, more preferably carbon fibers in which carbon fibers having a single filament number of from 8,000 to 100,000 are opened, and still more carbon fibers in which carbon fibers having a single filament number of from 10,000 to 80,000 are opened.

The random mat of the present invention preferably contains carbon fibers opened by at least one method selected from the group consisting of air opening, wet paper-making and carding, as described hereinafter regarding the carbon fiber mat.

The random mat of the present invention is preferably that the carbon fibers are substantially oriented at two-dimensional random. The "two-dimensional random" used here means that in a plane of the random mat, carbon fibers are not aligned in a specific direction and are arranged by dispersing in a random direction, and is further preferably a state that carbon fibers that are aligned in a vertical direction (Z direction) to the plane are not substantially present.

The random mat in which carbon fibers are substantially oriented at two-dimensional random is a so-called an in-plane isotropic base material, and an in-plane isotropic shaped product can be obtained by press molding this. There is a case that carbon fibers are entangled in a cotton form in the plane of the random mat even though the carbon fibers are not aligned in a specific direction. Such a random mat is substantially the same as the random mat having a three-dimensional random shape in which many carbon fibers are oriented in a vertical direction (Z direction) to the plane. In the case where the random mat having a three-dimensional random shape is molded, a problem may occur in, for example, fluidity of carbon fibers when molding.

As the random mat of the present invention, when an amount of the carbon fibers having a width of less than 0.3 mm is from 1% by weight to 30% by weight of the carbon fibers contained and the amount of the carbon fibers having a width of 1.5 mm or more is 10% by weight or more of the carbon fibers, springback amount is further suppressed, and this is preferred.

The amount of the carbon fibers having a width of less than 0.3 mm is more preferably from 5% by weight to 25% by weight, and particularly preferably from 8% by weight to 20% by weight, based on the total amount of the carbon fibers contained in the random mat.

The amount of the carbon fibers having a width of less than 1.5 mm is more preferably 30% by weight or more, and still more preferably 45% by weight or more, based on the total amount of the carbon fibers contained in the random mat. The upper limit of the amount of the carbon fibers having a width of less than 1.5 mm is preferably 90% by weight or less, and still more preferably 85% by weight or less, based on the total amount of carbon fibers contained in the random mat.

In the present invention, carbon fibers contained in the random mat and shaped product are classified into appropriate fiber width sections, for example, sections of every 0.3 mm, a proportion of each section when the total amount of carbon fibers is 100% by weight is obtained, and such proportions are sometimes called a (carbon) fiber distribution.

In the present invention, of lengths in two directions excluding a length direction of carbon fibers, the shorter length is defined as a "thickness" and other length is defined as a "width". In the case where dimensions of intersecting two directions are equal, optional one direction is defined as a width of carbon fibers, and another direction is defined as a thickness of carbon fibers.

[Carbon Fiber (A)]

Generally, carbon fibers are first produced in the form of a strand that is a fiber bundle in which from several thousands to several ten thousands of single filaments are gathered, the strand is then subjected to treatments such as weaving, opening, widening, cutting, crushing and the like, and such a strand is used in various uses. Carbon fiber strand and its cut product are sometimes called carbon fiber bundles.

In the present description, the number of single filaments constituting carbon fiber is sometimes called the number of fibers, and a diameter of a single filament is sometimes called a fiber diameter.

Hereinafter, to distinguish from carbon fibers (A) constituting the random mat or shaped product, carbon fibers as a broader concept or carbon fibers before a treatment such as opening are sometimes simply called a "fiber bundle" or a "strand".

The carbon fibers contained in the random mat and shaped product of the present invention is roughly classified into the carbon fibers (A) containing single carbon filaments of a critical single filament number or more, being defined in the formula (1), and other carbon fibers (B). The carbon fibers (B) mentioned here are single fibers (single filaments) and carbon fiber bundles (carbon fibers) constituted by single carbon filaments of the number smaller than the critical single filament number.

A proportion of the carbon fibers (A) to the total amount of the carbon fibers in the random mat is from 40 Vol % to 99 Vol %. In the case where the proportion of the carbon fibers (A) is less than 40 Vol %, it is difficult to increase a bulk density, and a pressure applied when molding cannot be reduced. In the case where the proportion of the carbon fibers (A) is larger than 99 Vol %, the carbon fibers (B) are not contained, and when a shaped product is formed, a shaped product having excellent mechanical strength is difficult to be obtained.

The carbon fibers (A) contained in the random mat and shaped product of the present invention are preferably a mixture of carbon fibers having various single filament numbers of the critical single filament number or more in aspect of moldability and the like.

The carbon fibers (B) contained in the random mat and shaped product of the present invention are preferably a mixture of carbon fibers of various single filament numbers of less than the critical single filament number, and carbon single filaments that do not form a bundle structure in moldability and the like.

The proportion of the carbon fibers (A) is preferably from 40 Vol % to 98 Vol %, more preferably from 40 Vol % to 97 Vol %, and still more preferably from 50 Vol % to less than 95 Vol %. The proportion is more preferably from 60 Vol % to 90 Vol %, and still more preferably 70 Vol % to 90 Vol %.

By this, the random mat is constituted of the carbon fibers (A) having low springback ratio and the carbon fibers (B) that fill spaces of the carbon fibers (A) and contribute to the development of homogeneous mechanical strength, and a molding pressure can be surely decreased. Additionally, high mechanical strength is obtained when a shaped product is formed.

The average number (N) of single filaments in the carbon fibers (A) is in a range defined by the formula (2). In the case where the average number (N) of single filaments of the carbon fibers (A) is less than $2.0 \times 10^5/D^2$, high bulk density is difficult to be obtained. In the case where the average number (N) of single filaments in the carbon fibers (A) is $8.0 \times 10^5/D^2$ or more, a thick portion is locally formed, and this is liable to lead to voids. The average number (N) of single filaments is preferably a range of the following formula (2-1), more preferably a range of the following formula (2-2), still more preferably a range of the following formula (2-3), and extremely preferably a range of the following formula (2-4):

$$2.0 \times 10^5/D^2 < N < 8.0 \times 10^5/D^2 \quad (2\text{-}1)$$

$$2.0 \times 10^5/D^2 < N \leq 5.0 \times 10^5/D^2 \quad (2\text{-}2)$$

$$2.0 \times 10^5/D^2 < N \leq 4.0 \times 10^5/D^2 \quad (2\text{-}3)$$

$$2.5 \times 10^5/D^2 \leq N \leq 4.0 \times 10^5/D^2 \quad (2\text{-}4)$$

Specifically, in the case where the average single filament diameter of the carbon fibers contained in the random mat and shaped product is from 5 μm to 7 μm, the critical single filament number is from 86 to 120. In the case where the average single filament diameter of the carbon fibers is 5 μm, the average number (N) of single filaments in the carbon fibers (A) is a range of from 8,000 to 32,000. In the case where the average single filament diameter of the carbon fibers is 7 μm, the average number (N) of single filaments in the carbon fibers is from 4,081 to 16,324.

The average thickness of the carbon fibers (A) is preferably 100 mm or less. The reason for this is that impregnation property of a molten thermoplastic resin into carbon fibers and development property of mechanical strength are improved. The range of the average thickness is preferably from 30 μm to 80 μm, more preferably from 40 μm to 70 μm, and still more preferably from 40 μm to 60 μm.

[Thermoplastic Resin]

The amount of the thermoplastic resin as a matrix resin in the random mat and shaped product of the present invention is preferably from 20 parts by weight to 500 parts by weight per 100 parts by weight of the carbon fibers. More preferably, the amount of the thermoplastic resin is from 25 parts by weight to 300 parts by weight per 100 parts by weight of the carbon fibers, and still more preferably, the amount of the thermoplastic resin is from 30 parts by weight to 200 parts by weight per 100 parts by weight of the carbon fibers. Smaller amount of the thermoplastic resin is preferred in that a shaped product having small plate thickness, light weight and high strength may be obtained.

The random mat and shaped product of the present invention can obtain those having good properties, appearance and moldability even though the content of carbon fibers is high level. An index of the content of carbon fibers can use a carbon fiber volume content ratio (hereinafter sometimes abbreviated as a fiber volume content ratio, Vf). The carbon fiber volume content ratio is a proportion (Vol %) of a volume of carbon fibers in the case where the total of a volume of carbon fibers and a volume of a thermoplastic resin as a matrix resin, in a random mat and a shaped product, is 100 Vol %.

From the standpoint of obtaining higher strength, the carbon fiber volume content ratio (Vf) of the random mat and shaped product of the present invention is preferably 23 Vol % or more, more preferably 28 Vol % or more, still more preferably 30 Vol % or more, still further preferably 35 Vol % or more, particularly preferably 45 Vol % or more, and extremely preferably 48 Vol % or more.

The carbon fiber volume content ratio (Vf) of the random mat and shaped product of the present invention is preferably 75 Vol % or less, more preferably 70 Vol % or less, still more preferably 65 Vol % or less, particularly preferably 60 Vol % or less, and extremely preferably 58 Vol % or less.

The kind of the thermoplastic resin is preferably at least one selected from the group consisting of vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acryl resin, methacryl resin, polyethylene resin, polypropylene resin, polyamide 6 resin, polyamide 11 resin, polyamide 12 resin, polyamide 46 resin, polyamide 66 resin and polyamide 610 resin, polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, polyether ether ketone resin and polylactic resin. Those thermoplastic resins may be used alone and may be used as a mixture of two or more thereof. Those thermoplastic resins may be a copolymer or a modified product.

[Other Agents]

The random mat and shaped product of fiber reinforced composite material according to the present invention may contain additives such as various fibrous or non-fibrous fillers such as glass fibers and organic fibers, a flame retardant, an UV absorber, a pigment, a release agent, a softener, a plasticizer, and a surfactant, as long as the object of the present invention is not impaired.

[Manufacturing Method of Random Mat and Shaped Product]

One example of a method for preferably obtaining a random mat and a shaped product, which is one embodiment of the present invention is described below.

FIG. 1 is a schematic view explaining one example of a manufacturing method of a random mat.

The random mat can be preferably manufactured by the following steps 1 to 6. Furthermore, the shaped product can be preferably manufactured by the following step 7.

1. Widening step of widening a strand X.
2. Separating step of separating a strand Y widened.
3. Cutting step of cutting a strand Z separated.
4. Opening step of opening the strand Z cut (hereinafter referred to as a "strand piece").

5. Spraying method of spraying strand pieces opened (hereinafter referred to as "carbon fiber bundles" (also called "carbon fibers AB"), and containing carbon fibers (A) and carbon fibers (B)) together with a fibrous or powdery thermoplastic resin while spreading the strand pieces.

6. Fixing step of fixing the carbon fibers (AB) and thermoplastic resin sprayed to obtain a random mat M.

7. Pressing step of press molding the random mat M obtained to obtain a shaped product.

Each step is described below by referring to the drawings.

[Widening Step]

The widening step widens the strand X pulled out of a creel part 11 by a widening unit 12. Widening of the strand X is performed by, for example, contacting the strand X with a bar extending in a direction crossing a traveling direction of the strand X supplied to the cutting step. The strand X widened is called the strand Y.

In the case where the fiber thickness of the strand X already reaches a desired thickness or in the case where the strand X is already widened, the widening step is not necessary. It is preferred that the strand X has a desired thickness by widening from the point of impregnation property of a thermoplastic resin into carbon fibers.

[Separating Step]

The separating step separates the strand Y by a separating unit 13. The separating is performed by forming one or more slits continuous in parallel to a longitudinal direction of the strand Y by utilizing, for example, a slitter. The strand Y separated is called the strand Z.

Separating the strand Y into, for example, ½ means that the strand Y is divided into two pieces. By the separating, the strand X can be divided into the desired average number of single filaments, and a shaped product achieving both suppression of springback and mechanical strength can be obtained.

Furthermore, by conducting the widening step and the separating step, the random mat M having the desired average number of single filaments can be formed without using a strand having small number of filaments, and reduction of cost can be achieved.

[Cutting Step]

The cutting step cuts the strand Z into a fixed length of from 5 mm to 100 mm by utilizing a cutting unit 14. As the cutting unit 14, for example, a rotary cutter may be used. The strand Z cut is called a strand piece.

By cutting the strand Z, the strand Z can be made to have a desired fiber length, and a shaped product having excellent mechanical strength can be obtained. That is, it is possible to obtain the random mat M achieving both suppression of springback and mechanical strength by the step 6.

[Opening Step]

A case of using air opening as an opening method is exemplified below. Regarding the present invention, air opening is to open carbon fibers by blowing a gas to the carbon fibers, and is not limited to the case that a gas used for opening is air, and various gases such as nitrogen and water vapor may be used.

The opening step is preferably that the strand piece is introduced in a pipe body 15, and a gas is blown to the strand piece passing in the pipe body 15, thereby opening the strand piece asunder. More specifically, the opening step is performed by blowing compressed air from the outside of the pipe body 15 to the inside thereof. A blowing direction is adjusted so as to directly blow the compressed air to the strand piece. Carbon fiber bundles in which the strand piece is opened are hereinafter sometimes called "carbon fibers (AB)".

The degree of opening can be appropriately controlled by a pressure of air, or the like. Specifically, the strand piece can be opened to the desired degree of opening by blowing compressed air from a blowing hole provided on a peripheral wall of the pipe body 15 at wind velocity of preferably from 50 to 500 m/sec.

More specifically, the blowing hole has a diameter of preferably about 1 mm, and a plurality of blowing holes is provided on the peripheral wall. The blowing is performed by applying a pressure of from 0.01 to 0.8 MPa from the outside of the pipe body 15 so as to blow the compressed air to the inside though the blowing holes.

Other than the method of opening fibers using the compressed air, it is preferred to mix the strand piece and the carbon fibers (B) in a desired ratio in the pipe body 15. In the case of separately preparing the carbon fibers (B), the strand piece previously cut is opened in air, water or the like so as to be less than the critical single filament number, and then supplied to the pipe body 15 in a desired supply amount. Thus, by preparing the carbon fibers (B) in a separate step, the proportions of the carbon fibers (A) and carbon fibers (B) can be exactly adjusted.

[Spraying Step]

The spraying step is that a fibrous or powdery thermoplastic is suctioned while spreading carbon fiber bundles, and the carbon fiber bundles and the thermoplastic resin are sprayed on, for example, a support (fixing net conveyer) 19. By this, the random mat M in which the carbon fibers (AB) and the thermoplastic resin are mixed can be preferably obtained.

In the spraying step, a thickness, a content of carbon fibers, a fiber areal weight of carbon fibers, and the like can be changed by appropriately selecting supply amounts of the carbon fibers (AB) and a thermoplastic resin, and a desired random mat M can be obtained.

Supply of the thermoplastic resin is conducted by a resin supply unit 17, and the thermoplastic resin in a predetermined amount per unit time is supplied.

The carbon fibers (AB) and fibrous or powdery thermoplastic resin are preferably sprayed so as to being two-dimensionally oriented. To spray the carbon fibers (AB) while being two-dimensionally oriented, for example, the following spraying method is utilized.

The spraying method of the carbon fiber bundles preferably uses a taper tube body 18 having a conical shape or the like. In the case where the taper tube body 18 has a conical shape or the like, when air is set to the inside from the upper part of the taper tube body 18, air is diffused in the taper tube body 18. By this, flow rate of the air in the taper tube body 18 is decreased, and at this time, rotating force is given to the carbon fibers (AB), thereby spreading the carbon fibers (A) to the state that orientation of fibers is two-dimensionally random. Thus, the carbon fiber bundles can be sprayed.

Specifically, the pipe body 15 in the opening step and the taper tube body 18 in the spraying step are connected up and down, and the sending of air from the upper part of the taper tube body 18 utilizes compressed air blown from the blowing holes of the pipe body 15.

The carbon fibers (AB) and thermoplastic resin for forming the random mat M are preferably sprayed on a breathable support 19 for the reasons described hereinafter.

[Fixing Step]

In the fixing step, the carbon fibers (AB) and thermoplastic resin sprayed are fixed in a mat shape. Particularly, it is preferred that regarding the carbon fiber bundles and thermoplastic resin that were sprayed on the breathable support 19, air is suctioned by a suction unit 20 from the back side of the support 19 to fix (adsorb) the carbon fiber bundles. The breathable support 19 is preferably a movable type, and is more preferably has a suction mechanism like the suction unit 20 and is a movable type.

The thermoplastic resin sprayed together with the carbon fibers (AB) is mixed with the sprayed carbon fibers, and is fixed by air suction if it is a fiber shape or is fixed with the carbon fibers (AB) air suctioned even if it is a powder shape, respectively. By this, a high quality random mat M in which the fixed amounts of the carbon fiber bundles and thermoplastic resin are controlled is formed.

Specifically, the random mat M having high two-dimensional orientation can be obtained by air suction through the breathable support 19 from the back side thereof. Furthermore, a powdery or short fiber-shaped thermoplastic resin can be suction and adsorbed on the breathable support 19 by utilizing negative pressure of air suction.

[Pressing Step]

The pressing step press molds the random mat M obtained by the above step. By this, a shaped product can be obtained. At this time, a plurality of random mats M is layered and a desired thickness can be achieved. Furthermore, one random mat M is used and press molded, and a thin plate material can be obtained.

In the pressing step, a thickness and a fiber volume content ratio of a shaped product may be adjusted by adding a film-shaped or sheet-shaped thermoplastic resin and the like to the carbon fiber mat or the random mat.

Method and conditions of the press molding are not particularly limited. Heat press is preferably conducted under the conditions of from a melting point of a thermoplastic resin as a matrix to the melting point plus 80° C., or under the conditions of from a melting point of a thermoplastic resin to a decomposition temperature thereof. Pressing pressure and pressing time can be appropriately adjusted.

A random mat including carbon fibers having different state or constitution, or a unidirectional material is layered on the random mat of the present invention, and the resulting layered body can be molded.

The random mat including carbon fibers having different state or constitution may be the random mat of the present invention, and may be a random mat that is not the random mat of the present invention.

Random mats containing carbon fibers of different state or constitution are not layered to each other, but random mats having various appropriate carbon fiber constitutions are selected and arranged depending on various sites such as a rib part of a mold, and molding may be conducted.

[Shaped Product of Fiber Reinforced Composite Material]

The present invention encompasses the invention of a shaped product of fiber reinforced composite material (hereinafter sometimes abbreviated as a "shaped product") obtained by molding the above-described random mat.

By utilizing the random mat having the constitution described above as a molding base material, an excellent shaped product having high fiber volume content ratio and mechanical strength can be obtained even under the condition that a pressure applied when molding is greatly lower than the usual pressure. The random mat according to the present invention is particularly that an average number (N) of singe filaments of the carbon fibers (A) satisfies the range defined by the formula (2). Therefore, springback of carbon fiber bundles is reduced when molding the random mat. By this, it is not necessary to suppress expansion of carbon fiber bundles when molding, and molding pressure can be reduced.

Particularly, the springback becomes a great problem in the case where a shaped product having high fiber volume content ratio is tried to be obtained. The springback greatly depends on the constitution of carbon fibers in a fiber-reinforced composite material, and even in the proportion of single filament fiber-shaped carbon fibers and carbon fibers having a bundle structure in which a plurality of single filaments is bundled, the amount of the springback is increased depending on the number of bundling. Furthermore, when the proportion (fiber volume content ratio) of carbon fibers in the composite material is increased, the amount of the springback is increased with increasing the content ratio. That is, a problem by springback becomes serious as the fiber volume content ratio of the shaped product of fiber reinforced composite material is increased.

The present invention encompasses the invention of a shaped product of fiber reinforced composite material containing carbon fibers and a thermoplastic resin, and having a springback ratio of 400% or less. The definition of the springback ratio is described in detail hereinafter. In the shaped product of fiber reinforced composite material of the present invention, the springback ratio is preferably 300% or less, and more preferably 250% or less.

The shaped product of fiber reinforced composite material of the present invention has low springback ratio, and can obtain a relatively thin-walled shaped product without severe molding conditions in the case of, for example, further press molding (remolding) the shaped product and utilizing it in a shaped product having other shape. For this reason, breakage of carbon fibers is difficult to occur when remolding the shaped product of fiber reinforced composite material of the present invention. Therefore, there is an advantage that reinforcing effect by carbon fibers and isotropy of carbon fibers are easily maintained even in a reshaped product.

Melt expansion rate (%) defined by the formula (11) described hereinafter can be used as a simple index regarding the springback. In the shaped product of fiber reinforced composite material of the present invention, the melt expansion rate is preferably 70% or less, more preferably 50% or less, still more preferably 30% or less, and extremely preferably 10% or less.

In the case of obtaining a shaped product of fiber reinforced composite material by molding the random mat of the present invention, unless other molding base material, thermoplastic resin, carbon fibers and the like are added when molding, the fiber volume content ratio of the random mat, the proportion of the carbon fibers (A), dimensions such as length, width and thickness of carbon fibers, and the like are generally maintained in the shaped product.

That is, the present invention encompasses the invention of a shaped product of fiber reinforced composite material containing carbon fibers having an average fiber length of from 3 mm to 100 mm and a thermoplastic resin, wherein the carbon fibers constitute a carbon fiber mat having a fiber areal weight of from 25 to 10,000 g/m², an amount of from 40 Vol % to 99 Vol % of the carbon fibers contained in the carbon fiber mat is carbon fibers (A) containing single carbon filaments of a critical single filament number or more defined by the following formula (1), and an average number (N) of single filaments in the carbon fibers (A) satisfies the following formula (2):

$$\text{Critical single fiber number} = 600/D \quad (1)$$

$$2.0 \times 10^5/D^2 \leq N < 8.0 \times 10^5/D^2 \quad (2)$$

(wherein D is an average single filament diameter (μm) of carbon fibers).

Preferred kind, characteristics and the like as the thermoplastic resin and carbon fibers contained in the fiber-reinforced composite shaped product of the present invention are the same as described regarding the random mat and its manufacturing method. Similar to the random mat, opened carbon fibers are preferred, and carbon fibers in which carbon fibers having a single filament number of from 5,000 to 175,000 are opened are preferred, as the carbon fibers contained in the shaped product of fiber reinforced composite material of the present invention.

In the shaped product of fiber reinforced composite material, a ratio obtained by dividing a large value of a tensile modulus in an arbitrary direction and a direction vertical to the arbitrary direction (hereinafter referred to as 0° direction and 90° direction, respectively) by a small value thereof (the ratio is hereinafter abbreviated as Eδ value) is preferably less than 2, more preferably 1.5 or less, and still more preferably 1.3 or less. Eδ is an index of isotropy of a material. When Eδ is less than 2, it is considered to be isotropic, when Eδ is less than 1.5, it is considered that isotropy is excellent, and when Eδ is 1.3 or less, it is considered that isotropy is particularly excellent. As is apparent from the definition, the minimum value of the Eδ value is 1.0.

Furthermore, a shaped product having a desired shape such as a three-dimensional shape can be obtained by appropriately selecting a shape of a mold.

Furthermore, the shaped product can have a layered structure (hybrid structure). A preferred manufacturing method for forming such a layered structure includes a method in which, for example, in a fixing step, a random mat, a non-woven fabric or the like including other kind of reinforcing fibers such as glass fibers and organic fibers is previously arranged on a breathable sheet, and carbon fiber bundles are sprayed thereon.

A thin-walled shaped product is obtained by using a thin-walled random mat or decreasing the number of random mats used. As a result, the shaped product can be preferably used as a skin of a sandwich member. A core material when a sandwich member is formed is not particularly limited, but a foam body of a resin, a non-woven fabric of glass fibers or organic fibers, and the like are preferably exemplified.

Furthermore, a sandwich member can be obtained by layering a shaped product together with a core member and then, for example, press molding. In the case where a layered structure with a non-woven fabric of the glass fibers or organic fibers as described above is formed, those non-woven fabric layers can be a core member of the sandwich member.

[Carbon Fiber Mat]

As is apparent from the above description, the present invention encompasses the invention of a carbon fiber mat in which carbon fibers having an average fiber length of from 3 mm to 100 mm constitute a mat shape having a fiber areal weight of from 25 to 10,000 g/m², wherein an amount of from 40 Vol % to 99 Vol % of the carbon fibers contained in the carbon fiber mat is carbon fibers (A) containing single carbon filaments of a critical filament number or more defined by the following formula (1), and an average number (N) of single filaments in the carbon fibers (A) satisfies the following formula (2):

$$\text{Critical filament number} = 600/D \quad (1)$$

$$2.0 \times 10^5/D^2 \leq N < 8.0 \times 10^5/D^2 \quad (2)$$

(wherein D is an average single filament diameter (μm) of carbon fibers).

Preferred kind, characteristics and the like as the carbon fibers contained in the carbon fiber mat of the present invention are the same as described regarding the random mat and its manufacturing method. Similar to the random mat, opened carbon fibers are preferred, and carbon fibers obtained by opening carbon fibers having single filaments number of from 5,000 to 175,000 are preferred, as the carbon fibers contained in the carbon fiber mat of the present invention.

The carbon fiber mat as used here is a mat that does not contain a thermoplastic resin as a matrix, but the carbon fiber mat may contain a polymer compound as a sizing agent or a binder agent of carbon fibers in an amount of 15 parts by weight or less, and more generally 10 parts by weight, per 100 parts by weight of the carbon fibers.

[Manufacturing Method of Carbon Fiber Mat]

A manufacturing method that is conducted in the same manner as in the manufacturing method of the random mat, except that the thermoplastic resin as a matrix resin is not used, is exemplified as one example of the manufacturing method of the carbon fiber mat of the present invention.

Examples of a method for opening unopened carbon fibers of a single filament number of from 5,000 to 175,000 such that the carbon fibers (A) satisfy the prescribed amount and the average number (N) of single filaments of the formula (2) include air opening, wet paper-making, carding, needle punching, and roller opening, and at least one method selected from the group consisting of air opening, wet paper-making and carding is preferred. Above all, air opening is preferred in that a carbon fiber mat in which the number of three-dimensional random carbon fibers is particularly small and two-dimensional random orientation property is high is liable to be obtained.

<Wet Paper-Making>

Wet paper-making is a method in which when a dispersion having fibers dispersed in a dispersion medium such as water is filtered to form a mat-like material (fiber mat), the fibers are opened into fibers of smaller number of single filaments. In the wet paper-making, the dispersion medium cannot be completely removed from the fiber mat by only filtration. Therefore, a treatment such as evaporation of the dispersion medium by heating is further required, and it says that the wet paper-making is slightly disadvantage in production cost as compared with air opening.

A step of conducting the wet paper-making is basically constituted by using a dispersion tank in which preparation of a dispersion, and spreading and opening of fibers are conducted, and a filtration apparatus for obtaining a fiber mat by filtering the dispersion. When the dispersion liquid is fed to the filtration apparatus from the dispersion tank and then filtered, if filtration is conducted without specific means, fibers are oriented in a liquid feeding direction in a liquid feeding pipe, and there is an undesirable case that a fiber mat having low two-dimensional orientation property and being difficult to say to have isotropy is obtained. In the case where fiber orientation occurs in the liquid feeding pipe, fibers filtered in the state of facing a vertical direction (Z direction) to a filtering surface, that is, the state of standing are increased, and there is a concern that the fiber mat obtained is a three-dimensional random state, not two-dimensional random orientation.

To obtain a fiber mat having higher two-dimensional random orientation property by wet paper-making, when a dispersion is supplied to a filtration surface of a filtration apparatus, it is preferred that a discharge part of the dispersion is moved front/rear and left/right (X direction and Y direction) to a filtering surface.

When carbon fibers are opened by a wet paper-making method without specific means as in WO2007/97436 described before, there is a case that all of carbon fibers are almost completely opened up to single filaments. As a method for obtaining the carbon fiber mat of the present invention by opening unopened carbon fibers by wet paper-making such that the carbon fibers (A) satisfy the above-described predetermined amount and the average number (N) of single filaments defined by the formula (2), at least one method selected from the following methods are exemplified as a preferred method:

a treatment of dispersing carbon fibers in a dispersion medium to open the carbon fibers is conducted in an extremely short period of time without conducting stirring of a dispersion;

extremely large amount of carbon fibers is introduced in a dispersion medium;

carbon fibers treated with a sizing agent in which affinity of a dispersion medium is not so high, that is, water solubility is not so high when a dispersion medium is water, are used; and carbon fibers in which a sizing agent that is difficult to solve in a dispersion medium is attached to a part of single carbon filaments constituting the carbon fibers and a sizing agent that is easy to solve in a dispersion medium is attached to another part of single carbon filaments are used.

Furthermore, it is preferred that large tow carbon fibers of a single filament number of from 40,000 to 175,000 are used and combined with the above method.

It is possible to obtain a random mat by forming a thermoplastic resin as a matrix resin into a granular shape or a fiber shape, mixing it with carbon fibers, and conducting operation, when conducting the wet paper-making.

As is apparent from the above, the present invention encompasses the invention of manufacturing a reinforcing fiber opened product in which an average number of single filaments is less than a single filament number before opening and more than one, by opening performed by using reinforcing fibers in which a sizing agent that is difficult to solve in a dispersion medium in a wet paper-making method is attached to a part of single carbon filaments and a sizing agent that is easy to solve in a dispersion medium is attached to another part of single carbon filaments, in opening reinforcing fibers in which single filaments have a bundle structure, such as carbon fibers. From a multiplicity of uses, the average number of single filaments of the reinforcing fiber opened product is more preferably 16,000 or less, still more preferably 10,000 or less, and further preferably 8,000 or less. The average number of single filaments of the reinforcing fiber opened product is preferably 10 or more, more preferably 100 or more, and still more preferably 1,000 or more.

The present invention encompasses the inventions of the above-described reinforcing fiber opened product, a random mat including the reinforcing fiber opened product and a resin, and a shaped product containing the reinforcing fiber opened product.

[Carding]

Carding generally means a treatment of treating discontinuous fibers such as cotton with a comb to align the orientation of the discontinuous fibers or open the discontinuous fibers, and an apparatus that performs carding is called a carding machine.

The carbon fiber mat of the present invention can be obtained by treating carbon fibers by carding. The method and apparatus described in WO2013/116869 are exemplified as the carding method and apparatus.

In obtaining the carbon fiber mat of the present invention by opening carbon fibers by carding, there is a case that problem such that breakage of carbon fibers remarkably occurs. To suppress the occurrence of those problems, methods such that:

carding is conducted in an extremely short period of time, operation rate of a comb when carding is set rather low;

carding is conducted by a carding machine having a comb made of a material having appropriate flexibility and elasticity; and carding is conducted by mixing fibers of a thermoplastic resin with carbon fibers, may be used.

In carding as above, it is possible to obtain a random mat by mixing fibers of a thermoplastic resin as a matrix resin with carbon fibers and conducting operation.

In many fiber mats obtained by the carding treatment, fibers are aligned. Therefore, the carbon fiber mat of the present invention obtained by the carding treatment is preferably a mat obtained by preparing a plurality of carded products, and layering those to thereby further increasing in-plane isotropy. Naturally, in layering the carded products, it is preferred to arrange each carded product and layer it such that the orientation directions of the carbon fibers in the carded product differ in a certain proportion.

Such a layering method includes a method in which a second carded product is arranged and layered on a first carded product (its carbon fiber orientation direction is 0°) such that its carbon fiber orientation direction is 90° (hereinafter abbreviated as 90° direction layering), a third carded product is arranged and layered such that its carbon fiber orientation direction is 0° (abbreviated as 0° direction layered), and subsequently, 90° direction layering of even numbered carded products and 0° direction layering of odd numbered card products are appropriately repeated to form a carbon fiber mat.

EXAMPLES

Examples are described below, but the present invention is not limited to those. Regarding carbon fiber and its sample, a unit of fiber length, fiber width and thickness is "mm", and a unit of weight is "g". Furthermore, a unit of thickness of carbon fibers is "µm". Densities of carbon fibers (strand) and a thermoplastic resin used in the following Examples and Comparative Examples are as follows. Carbon fibers here are all PAN-based Carbon fiber "TENAX" (registered trademark) UTS50-24K: 1.79 g/cm$^3$ Carbon fiber "TENAX" (registered trademark) UTS50-12K: 1.80 g/cm$^3$ Carbon fiber "TENAX" (registered trademark) STS40-24K: 1.75 g/cm$^3$ Polycarbonate: 1.20 g/cm$^3$, glass transition temperature 150° C., temperature corresponding to melting point=230° C.

Polyamide 6: 1.14 g/cm$^3$, melting point 225° C.

[Analysis of Carbon Fiber Bundle in Random Mat]

Random mat is cut into a size of 100 mm×100 mm. Carbon fiber bundles are taken out of the cut mat with tweezers, and the number (I) of the carbon fiber bundles, and length (Li) and weight (Wi) of carbon fiber bundles are measured and recorded.

Regarding mats in which carbon fiber bundles are small to such an extent that the carbon fiber bundles cannot be taken out of the mat with tweezers, those mats are collected, and its weight is finally measured (Wk). A balance measurable down to 1/100 mg is used for the measurement of weight. In the case where the carbon fiber bundles and the resin can be separated to each other, only carbon fiber bundles are taken out with tweezers, and in the case where the carbon fiber bundles and the resin cannot be separated to each other, the mat is heated at, for example, 500° C. for about 1 hour to remove the resin, and weight is measured.

Critical single filament number is calculated from a fiber diameter (D) of the carbon fibers used, and the carbon fibers are classified into carbon fibers (A) of the critical single filament number or more and being in the range of the formula (2), and carbon fibers (B) other than carbon fibers (A).

The average number (N) of single filaments in the carbon fibers (A) is obtained as follows.

The number (Ni) of fibers in the carbon fiber is obtained from tex (F (g/1000 m)) and the number (n) of filaments of the carbon fibers used, by the following formula (3).

$$Ni = Wi/(Li \times F/n) \quad (3)$$

The average number (N) of single filaments in the carbon fibers (A) is obtained from the number (J) of bundles and the number (Nj) of fibers in the carbon fibers including the number of fibers of a critical single filament number or more of the total carbon fiber bundles by the following formula (4).

$$N = \Sigma Nj/J \quad (4)$$

The proportion (VR) of the carbon fibers (A) to the total amount of fibers in the random mat is obtained by the following formula (5) using a density (ρ) of carbon fibers.

$$VR = \Sigma(Wj/\rho) \times 100/((Wk + \Sigma Wi)/\rho) \quad (5)$$

[Analysis of Average Fiber Length and Average Fiber Thickness of Carbon Fibers]

Regarding 100 carbon fiber bundles randomly extracted from a random mat, their lengths were measured with vernier calipers or a loupe down to a unit of 1 mm and recorded, their thicknesses were measured with a micrometer down to a unit of 1 μm, and those values were recorded. An average fiber length (L) and an average fiber thickness (T) were obtained by the following formulae (6) and (7) from lengths (Li) and thicknesses (Ti) of all of the carbon fiber bundles measured. In the case where fibers and a resin cannot be separated to each other, a resin was removed in a furnace at 500° C. for about 1 hour, and carbon fiber bundles were then extracted.

[Measurement of Width of Carbon Fibers and Fiber Width Distribution]

Regarding 100 carbon fiber bundles arbitrarily extracted from a random mat, the individual fiber width (Wi) was measured, and classified into each section of a width of less than 0.3 mm, a width of from 0.3 mm to less than 0.6 mm, a width of from 0.6 mm to less than 0.9 mm, a width of from 0.9 mm to less than 1.2 mm, a width of from 1.2 mm to less than 1.5 mm and a width of 1.5 mm or more. Weight of each section was measured, and the proportion of each section (weight % when the total amount of carbon fibers is 100% by weight) was calculated.

$$L = \Sigma Li/100 \quad (6)$$

$$T = \Sigma Ti/100 \quad (7)$$

[Method for Obtaining Springback in Shaped Product]

Thicknesses of a shaped mat and a random mat obtained by melting a resin in a shaped product were measured by the following procedures 1 to 4, and a springback amount was calculated. This measurement was conducted at least five times in the same level and in different portions of the shaped product and random mat, and its average value is defined as a thickness measurement value. The shaped product to be measured is a shaped product that does not have voids therein, and in the case where a shaped product contains voids, a thickness is measured in the state that inner voids have been removed by heating and pressuring, and its value is defined as an initial thickness ($t_{c0}$).

1. A shaped product is cut into a size of 50 mm×50 mm, and an initial thickness ($t_{c0}$) of the shaped product is measured.
2. A shaped product whose thickness was measured is heated at (melting point of resin+50° C.) for 10 minutes in a furnace to melt a thermoplastic resin. In the case where the thermoplastic resin is amorphous, the thermoplastic resin is heated at a temperature at which the resin sufficiently melts, for 10 minutes in a furnace. In the case where the thermoplastic resin cannot sufficiently melt under the above conditions, heating temperature is increased to sufficiently melt the resin.
3. The temperature in the furnace is decreased, and when a test piece (random mat) is cooled to a melting point or lower, for example, ordinary temperature, the test piece moves to a flat place with tweezers, and a thickness ($t_{c1}$) after melting of a random mat is measured.
4. Springback amount, springback ratio and the like of the shaped product are obtained by using the initial thickness ($t_{c0}$), thickness ($t_{c1}$) after melting and fiber volume content ratio (Vf) obtained, by the following formulae (8) to (11), respectively.

Carbon fiber layer thickness ($t_{f0}$) in the shaped product was obtained by the following formula (9) in the assumption that carbon fibers have uniform thickness in the plane in a test piece measured.

$$\text{Springback amount (mm)} = \text{thickness } (t_{c1}) \text{ after melting} - \text{initial thickness } (t_{c0}) \quad (8)$$

$$\text{Carbon fiber layer thickness } (t_{f0}) \text{ (mm)} = ((\text{initial thickness } (t_{c0}) \times 50 \text{ (mm)} \times 50 \text{ (mm)}) \times \text{fiber volume content ratio } (Vf))/2500 \text{ (mm}^2) \quad (9)$$

$$\text{Springback ratio (\%)} = \text{thickness } (t_{c1}) \text{ after melting} \times 100/\text{carbon fiber layer thickness } (t_{f0}) \quad (10)$$

$$\text{Melt expansion rate (\%)} = 100 \times \text{springback amount (mm)}/\text{initial thickness } (t_{c0}) \quad (11)$$

[Measurement of Thickness of Shaped Product]

Thicknesses of a shaped product obtained were measured in 13 places from the whole shaped product using a micrometer, and an average value was obtained. Lattice measurement points were prepared as measurement places at a center of a shaped product and of ±50 cm in vertical and horizontal directions from the center, and thicknesses of 8 places of circumference were measured (in Table 1, the average thickness is described as a center thickness of a shaped product). As a thickness of ends of a shaped product, thicknesses at positions of 10 mm or more and 15 mm or less from the ends were measured at 4 places in total in the vicinity of respective centers of four sides of a shaped product.

[Flexural Test]

A test piece was cut out of a shaped product using water jet, and flexural strength was measured using a universal tester manufactured by Instron by reference to JIS K 7074-1988. A distance (Lt) between support points was calculated from Lt=40×h (h is a thickness of a test piece), and testing rate was 5 mm/min.

In the case where a thickness of a shaped product exceeds 3 mm, a shaped product having a thickness of 2 mm in which a fiber volume content ratio is the same was prepared, and a value of flexural strength of such a shaped product was used.

[Tensile Test]

A test piece is cut out of a shaped product using water jet, and tensile strength and tensile modulus are measured using a Tensilon universal tester manufactured by A&D Company, Limited, by reference to JIS K 7164: 2005. A test piece is an A type test piece or a test piece according to this. Chuck distance is about 115 mm, and a test rate is 2 mm/min. Test pieces are cut out of a shaped product in an optional direction (0° direction) and a direction crossing the 0° direction (90° direction), respectively, and tensile strength and tensile modulus in the two directions are measured. Regarding the tensile modulus measured, a ratio (Eδ value) obtained by dividing a large value by a small value is calculated.

Example 1

Carbon fibers (manufactured by Toho Tenax Co., Ltd.: TENAX UTS50-24K (fiber diameter D: 6.9 μm, fiber width: 10 mm, tensile strength: 5,000 MPa)) were widened to a width of 25 mm. The widened strand was separated into ⅕, and then cut in a fiber length of 20 mm.

The strand pieces were introduced in a pipe body in a supply amount of 400 g/min, and compressed air was blown to the strand pieces in the pipe body to partially open the strand pieces. In the opening, compressed air was sent in 50 m/sec from blowing holes. Carbon fiber bundles including opened strand pieces were mixed with a thermoplastic resin, and the resulting mixture was sprayed with a width of 1,000 mm on a breathable support (movable in 0.17 m/min) arranged at the lower part of an exit of a taper tube body while air suctioning. Thus, a random mat including a mixture of the carbon fiber bundles (carbon fibers (AB)) having an average fiber length of 20 mm and the thermoplastic resin was obtained. In the random mat, the carbon fibers (AB) were two-dimensional randomly oriented to form a mat shape. Of the carbon fibers (AB), carbon fibers (A) were a mixture of carbon fibers having various single filament numbers of a critical single filament number or more, and carbon fibers (B) were a mixture of carbon fibers having various single filament numbers of less than the critical single filament number and single carbon filaments that do not form a bundle structure.

Polycarbonate resin obtained by freezing and crushing into an average particle size of 600 μm (polycarbonate manufactured by Teijin Chemicals Ltd.: PANLITE L-1225L) was used as the thermoplastic resin. The average fiber length (L) of the carbon fiber bundles, the proportion of the carbon fibers (A), the average number (N) of single filaments in the carbon fibers (A) and the average thickness (T) of the carbon fibers (A), in the random mat obtained were examined. As a result, the average fiber length (L) was 20 mm, the critical single filament number defined by the formula (1) was 86, the proportion of the carbon fibers (A) to the total amount of fibers was 86%, the average number (N) of single filaments in the carbon fibers (A) was 4,200, and the average thickness (T) of the carbon fibers (A) was 54 μm, as shown in Table 1. Fiber width distribution of the carbon fibers in the random mat was obtained. As a result, the amount of the carbon fibers having a width of less than 0.3 mm was 14.0% by weight, the amount of the carbon fibers having a width of 1.5 mm or more was 78.1% by weight, and the amounts of the carbon fibers in other sections were each less than 10.0% by weight.

The random mat prepared was heated at 300° C. for 20 minutes while applying a pressure, thereby a random mat having a thickness of 3.3 mm in which the carbon fibers were impregnated with the thermoplastic resin was obtained. The random mat was cut such that a charge rate as a prepreg to a mold is 90%, and the random mat cut was arranged in a pressing machine heated to 280° C. and molded under a molding pressure of 2.0 MPa. Thus, a shaped product of 3.0 mm was obtained.

As a result of thickness evaluation regarding the shaped product obtained, as shown in Table 1, an average thickness at the central part is 3.02 mm, an average thickness at the ends (four places) is 2.95 mm, and it can be confirmed that the random mat is equally (thickness is uniform) and sufficiently charged up to the ends of a mold.

Furthermore, as shown in Table 1, the fiber volume content ratio of the shaped product obtained was 50 Vol %, the springback amount was 0.61 mm, the melt expansion rate was 20.3%, and the springback ratio was 240%. As a result of evaluating flexural strength according to JIS K 7074-1988, the flexural strength was 620 MPa.

From the above results, although the molding pressure is the same 2.0 MPa as in Comparative Examples, high fiber volume content ratio and flexural strength were obtained as compared with Comparative Examples.

Example 2

Carbon fibers (manufactured by Toho Tenax Co., Ltd.: TENAX STS40-24K (fiber diameter: 7.0 μm, fiber width: 10 mm, tensile strength: 4,000 MPa)) were widened to a width of 20 mm. The widened strand was separated to intervals of 5 mm (¼), and then cut in a fiber length of 8 mm.

The strand pieces were introduced in a pipe body in a supply amount of 400 g/min, and compressed air was blown to the strand pieces in the pipe body to partially open the strand pieces. In the opening, compressed air was sent in 50 m/sec from blowing holes. Carbon fiber bundles including opened strand pieces were mixed with a thermoplastic resin, and the resulting mixture was sprayed with a width of 1,000 mm on a breathable support (movable in 0.14 m/min) arranged at a lower part of an exit of a taper tube body while air suctioning. Thus, a random mat including a mixture of the carbon fiber bundles having an average fiber length of 8 mm and the thermoplastic resin was obtained. In the random mat, the carbon fibers (AB) were two-dimensional randomly oriented to form a mat shape. Of the carbon fibers (AB), carbon fibers (A) were a mixture of carbon fibers having various single filament numbers of a critical single filament number or more, and carbon fibers (B) were a mixture of carbon fibers having various single filament numbers of less than the critical single filament number and single carbon filaments that do not form a bundle structure.

Polyamide 6 resin obtained by freezing and crushing into an average particle size of 600 μm (polyamide 6 manufactured by Unitika Ltd.: A1030) was used as the thermoplastic resin. An average fiber length (L) of the carbon fiber bundles, a proportion of the carbon fibers (A), an average number (N) of single filaments in the carbon fibers (A) and an average thickness (T) of the carbon fibers (A), in the random mat obtained were examined in the same manner as in Example 1, and are shown in Table 1. Fiber width distribution of the carbon fibers in the random mat was obtained. As a result, an amount of carbon fibers having a width of less than 0.3 mm was 10.0% by weight, an amount of carbon fibers having a width of 1.5 mm or more was 80.2% by weight, and amounts of carbon fibers in other sections were each less than 10.0% by weight. Regarding the present invention, the average fiber length (L) of the carbon fiber bundles, the proportion of the carbon fibers (A), the average number (N) of single filaments in the carbon fibers (A), the average thickness (T) of the carbon fibers (A), and the fiber width distribution of carbon fibers, contained in the random mat and shaped product are sometimes called opening indexes.

The random mat prepared was heated at 280° C. for 20 minutes while applying a pressure, thereby a random mat having a thickness of 3.3 mm in which the carbon fibers were impregnated with the thermoplastic resin was obtained. The random mat was cut such that a charge rate as a prepreg to a mold is 90%, and the random mat cut was arranged in a pressing machine heated to 260° C. and molded under a molding pressure of 2.0 MPa in the same manner as in Example 1. Thus, a shaped product of 3.0 mm was obtained.

As a result of thickness evaluation regarding the shaped product obtained, as shown in Table 1, an average thickness at the central part is 3.01 mm, an average thickness at the ends (four places) is 2.96 mm, and it can be confirmed that the random mat is equally (thickness is uniform) and sufficiently charged up to the ends of a mold.

Furthermore, calculation results of a fiber volume content ratio, a springback amount and a springback ratio of the shaped product obtained and the results of evaluation of flexural strength are shown in Table 1.

As shown in Table 1, the fiber volume content ratio of the shaped product obtained was 55 Vol %, the springback amount was 0.79 mm, the melt expansion rate was 26.3%, and the springback ratio was 230%. The flexural strength was 650 MPa.

From the above results, even in Example 2, similar to Example 1, although the molding pressure is the same 2.0 MPa as in Comparative Examples, high fiber volume content ratio and flexural strength were obtained as compared with Comparative Examples.

Example 3

Carbon fibers (manufactured by Toho Tenax Co., Ltd.: TENAX UTS50-12K (fiber diameter: 6.9 μm, fiber width: 10 mm, tensile strength: 4,900 MPa)) were cut in a fiber length of 30 mm.

The strand pieces were introduced in a pipe body in a supply amount of 500 g/min, and compressed air was blown to the strand pieces in the pipe body to partially open the strand pieces. In the opening, compressed air was sent in 80 m/sec from blowing holes. Carbon fiber bundles including opened strand pieces were mixed with a thermoplastic resin, and the resulting mixture was sprayed with a width of 1,000 mm on a breathable support (movable in 0.14 m/min) arranged at a lower part of an exit of a tapered tube body while air suctioning. Thus, a random mat including a mixture of the carbon fiber bundles having an average fiber length of 30 mm and the thermoplastic resin was obtained. In the random mat, the carbon fibers (AB) were two-dimensional randomly oriented to form a mat shape. Of the carbon fibers (AB), carbon fibers (A) were a mixture of carbon fibers having various single filament numbers of a critical single filament number or more, and carbon fibers (B) were a mixture of carbon fibers having various single filament numbers of less than the critical single filament number and single carbon filaments that do not form a bundle structure.

Polyamide 6 resin obtained by freezing and crushing into an average particle size of 600 μm (polyamide 6 manufactured by Unitika Ltd.: A1030) was used as the thermoplastic resin. The average fiber length (L) of the carbon fiber bundles, the proportion of the carbon fibers (A), the average number (N) of single filaments in the carbon fibers (A) and the average thickness (T) of the carbon fibers (A), in the random mat obtained were examined in the same manner as in Example 1, and are shown in Table 1. Fiber width distribution of the carbon fibers in the random mat was obtained. As a result, an amount of carbon fibers having a width of less than 0.3 mm was 30.0% by weight, an amount of carbon fibers having a width of 1.5 mm or more was 64.0% by weight, and amounts of carbon fibers in other sections were each less than 5.0% by weight. The random mat prepared was heated at 280° C. for 20 minutes while applying a pressure, thereby a random mat having a thickness of 4.4 mm in which the carbon fibers were impregnated with the resin was obtained. The random mat was cut such that a charge rate as a prepreg to a mold is 90%, and the random mat cut was arranged in a pressing machine heated to 260° C. and molded under a pressure of 2.0 MPa in the same manner as in Example 1. Thus, a shaped product of 4.0 mm was obtained.

As a result of thickness evaluation regarding the shaped product obtained, as shown in Table 1, an average thickness at the central part is 3.98 mm, an average thickness at the ends (four places) is 3.95 mm, and it can be confirmed that the random mat is equally (thickness is uniform) and sufficiently charged up to the ends of a mold.

Furthermore, the calculation results of the fiber volume content ratio, springback amount and springback ratio of the shaped product obtained and the results of the evaluation of flexural strength are shown in Table 1.

As shown in Table 1, the fiber volume content ratio of the shaped product obtained was 50 Vol %, the springback amount was 0.22 mm, the melt expansion rate was 5.5%, and the springback ratio was 210%. The flexural strength was 600 MPa.

From the above results, even in Example 3, similar to other Examples, although the molding pressure is the same 2.0 MPa as in Comparative Examples, high fiber volume content ratio and flexural strength were obtained as compared with Comparative Examples.

Comparative Example 1

Carbon fibers (manufactured by Toho Tenax Co., Ltd.: TENAX STS40-24K (fiber diameter: 7.0 μm, fiber width: 10 mm, tensile strength: 4,000 MPa)) were widened to a width of 20 mm. The widened strand was cut to form strand pieces having a fiber length of 10 mm.

The strand pieces were introduced in a pipe body in a supply amount of 400 g/min, and compressed air was blown to the strand pieces in the pipe body to partially open the strand pieces. In the opening, compressed air was sent in 450 m/sec from blowing holes. Carbon fiber bundles including opened strand pieces were mixed with a thermoplastic resin, and the resulting mixture was sprayed with a width of 1,000 mm on a breathable support (movable in 0.25 m/min) arranged at a lower part of an exit of a tapered tube body while air suctioning. Thus, a random mat including a mixture of the carbon fiber bundles having an average fiber length of 10 mm and the thermoplastic resin was obtained.

Polycarbonate resin obtained by freezing and crushing into an average particle size of about 600 μm (polycarbonate manufactured by Teijin Chemicals Ltd.: PANLITE L-1225L) was used as the thermoplastic resin. The average fiber length (L) of the carbon fiber bundles, the proportion of the carbon fibers (A), the average number (N) of single filaments in the carbon fibers (A) and the average thickness (T) of the carbon fibers (A), in the random mat obtained were examined in the same manner as in Example 1, and are shown in Table 1. Fiber width distribution of the carbon fibers in the random mat was obtained. As a result, an amount of carbon fibers having a width of less than 0.3 mm was 65.0% by weight, an amount of carbon fibers having a width of 1.5 mm or more was 0.2% by weight, and an amount of carbon fibers having a width of from 0.3 to less than 1.5 mm was 34.8% by weight.

The random mat prepared was heated at 300° C. for 20 minutes while applying a pressure, thereby a random mat having a thickness of 3.3 mm in which the carbon fibers were impregnated with the resin was obtained. The random mat was cut such that a charge rate as a prepreg to a mold is 90%, and the random mat cut was arranged in a pressing machine heated to 280° C. and molded under a molding pressure of 2.0 MPa in the same manner as in the Examples. Thus, a shaped product of 3.0 mm was obtained.

As a result of thickness evaluation regarding the shaped product obtained, as shown in Table 1, an average thickness at the central part is 3.07 mm, an average thickness at the ends (four places) is 2.89 mm, and it can be confirmed that the random mat is charged up to the ends of a mold.

Thickness irregularity (difference between maximum thickness and minimum thickness) at the ends (four places) of the shaped product is 0.08 mm, and this is larger than the thickness irregularity in Examples (from 0.02 to 0.03 mm).

Furthermore, the calculation results of the fiber volume content ratio, springback amount and springback ratio of the shaped product obtained and the results of the evaluation of flexural strength are shown in Table 1.

As shown in Table 1, the fiber volume content ratio of the shaped product obtained was 30 Vol %, the springback amount was 10.15 mm, the melt expansion rate was 338.3%, and the springback ratio was 1,430%. The flexural strength was 398 MPa.

From the above results, the shaped product is charged up to the ends, but thickness irregularity at the ends is large.

Comparative Example 2

Carbon fibers (manufactured by Toho Tenax Co., Ltd.: TENAX STS40-24K (fiber diameter: 7.0 μm, fiber width: 10 mm, tensile strength: 4,000 MPa)) were used. A rotary cutter in which an angle of a knife is set to 90° in a circumferential direction, knives having a blade width of 1 mm are arranged at pitches of 16 mm in the circumferential direction, and the adjacent knifes are arranged so as to be 1 mm offset to each other in the circumferential direction was used as a cutting apparatus.

The strand pieces were introduced in a pipe body in a supply amount of 300 g/min, and compressed air was blown to the strand pieces in the pipe body to partially open the strand pieces. In the opening, compressed air was sent in 100 m/sec from blowing holes. Carbon fiber bundles including opened strand pieces were mixed with a thermoplastic resin, and the resulting mixture was sprayed with a width of 1,000 mm on a breathable support (movable in 0.19 m/min) arranged at a lower part of an exit of a taper tube body while air suctioning. Thus, a random mat including a mixture of the carbon fiber bundles having an average fiber length of 16 mm and the thermoplastic resin was obtained.

Polycarbonate resin obtained by freezing and crushing into an average particle size of about 600 μm (polycarbonate manufactured by Teijin Chemicals Ltd.: PANLITE L-1225L) was used as the thermoplastic resin. The average fiber length (L) of the carbon fiber bundles, the proportion of the carbon fibers (A), the average number (N) of single filaments in the carbon fibers (A) and the average thickness (T) of the carbon fibers (A), in the random mat obtained were examined in the same manner as in Example 1, respectively, and are shown in Table 1. Fiber width distribution of the carbon fibers in the random mat was obtained. As a result, an amount of carbon fibers having a width of less than 0.3 mm was 47.0% by weight, an amount of carbon fibers having a width of 1.5 mm or more was 3.0% by weight, and an amount of carbon fibers having a width of from 0.3 to less than 1.5 mm was 50.0% by weight.

The random mat prepared was heated at 300° C. for 20 minutes while applying a pressure thereto, thereby its thickness was 2.2 mm. The random mat after pressuring and heating was cut such that a charge rate as a prepreg to a mold is 90%, and the random mat cut was arranged in a pressing machine heated to 280° C. and molded under a molding pressure of 2.0 MPa in the same manner as in the Examples. Thus, a shaped product of 2.1 mm was obtained.

As a result of thickness evaluation regarding the shaped product obtained, as shown in Table 1, an average thickness at the central part is 2.10 mm, an average thickness at the ends (four places) is 1.72 mm, and it can be confirmed that the random mat could not be charged up to the ends of a mold.

Thickness irregularity at the ends (four places) of the shaped product is 0.2 mm, and this is larger than the thickness irregularity in Examples (from 0.02 to 0.03 mm).

The calculation results of the fiber volume content ratio, springback amount and springback ratio of the shaped product obtained and the results of the evaluation of flexural strength are shown in Table 1.

As shown in Table 1, the fiber volume content ratio of the shaped product obtained was 44 Vol %, the springback amount was 1.93 mm, the melt expansion rate was 91.9%, and the springback ratio was 450%. The flexural strength was 520 MPa.

From the above results, in Comparative Example 2, even though the molding pressure is the same 2.0 MPa as in Examples, the shaped product cannot be charged up to the ends, and thickness irregularity is large.

TABLE 1

|  |  | Example 1 | Example 2 | Example 3 | Comparative Example 1 | Comparative Example 2 |
|---|---|---|---|---|---|---|
| Random mat | Average fiber length (mm) | 20 | 8 | 30 | 10 | 16 |
|  | Proportion of fiber bundles (A) VR (%) | 86 | 90 | 70 | 35 | 53 |
|  | Average number (N) of fibers in fiber bundles (A) | 4200 | 5400 | 8200 | 240 | 1600 |

TABLE 1-continued

|  |  | Example 1 | Example 2 | Example 3 | Comparative Example 1 | Comparative Example 2 |
|---|---|---|---|---|---|---|
|  | Average thickness T of fiber bundles (A) (μm) | 54 | 68 | 58 | 22 | 108 |
|  | Thermoplastic resin | PC | PA6 | PA6 | PC | PC |
| Shaped product | Molding pressure (MPa) | 2.0 | 2.0 | 2.0 | 2.0 | 2.0 |
|  | Springback amount (mm) | 0.61 | 0.79 | 0.22 | 10.15 | 1.93 |
|  | Springback ratio (%) | 240 | 230 | 210 | 1430 | 450 |
|  | Center thickness of shaped product (mm) | 3.02 | 3.01 | 3.98 | 3.07 | 2.10 |
|  | Edge thickness of shaped product (mm) | 2.95 | 2.97 | 3.95 | 2.91 | 1.76 |
|  |  | 2.96 | 2.97 | 3.97 | 2.93 | 1.80 |
|  |  | 2.95 | 2.96 | 3.95 | 2.88 | 1.72 |
|  |  | 2.94 | 2.95 | 3.94 | 2.85 | 1.60 |
|  | Fiber volume content ratio (Vol %) | 50 | 55 | 50 | 30 | 44 |
|  | Flexural strength (MPa) | 620 | 650 | 600 | 398 | 520 |

[Regarding Springback]

The shaped product obtained by utilizing a random mat forms a shaped product having desired thickness and shape by once heating and pressuring the random mat to impregnate the random mat with a resin (in the case of forming a prepreg) as described in the above Examples and Comparative Examples, and then pressuring and heating utilizing a mold.

Therefore, large pressure is required when molding as the difference between a thickness in a molten state of the thermoplastic resin of the random mat and a thickness of the shaped product is large. In other words, large pressure is required when molding as a bulk density of the random mat is small.

On the other hand, a bulk density is determined by an average number of single filaments of carbon fiber bundles constituting a random mat and a proportion of the carbon fibers (A). In the case where a bulk density is evaluated in a random mat, there is a possibility of receiving influences of a content ratio of thermoplastic resin and a solidified state of a resin, other than the constitution of the fiber bundles.

In view of the above, the present inventors compared an initial thickness ($t_{c0}$) of a shaped product restrained by a solidified thermoplastic resin and a thickness (thickness ($t_{c1}$) after melting) of a random mat which is returned to an original state of a random mat by melting the thermoplastic resin to remove restraint thereof, as a method for evaluating a bulk density without receiving influence of a state of the thermoplastic resin, and the like. In conducting this evaluation, the evaluation was conducted after previously confirming that voids were not present in the inside of a shaped product and a thermoplastic resin was sufficiently charged.

The phenomenon that a fiber-reinforced mat restrained by a thermoplastic resin returns to the original state of the fiber-reinforced mat by eliminating its restraint force is defined as springback, and is explained by using the springback as a phenomenon corresponding to a concept of a bulk density. The springback amount and springback ratio in Table 1 are calculated from the formulae (8) to (10) described before.

Figure 2:
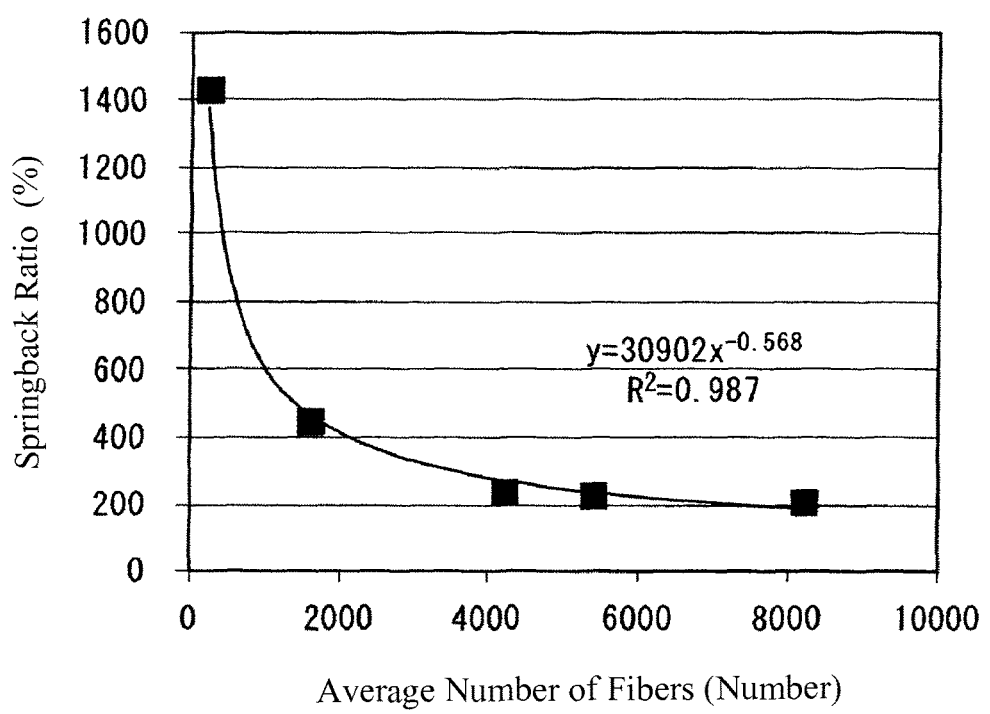
FIG. 2 is a view showing the relationship between an average number of fibers in carbon fiber bundles and a springback ratio.

FIG. 2 is a view showing the relationship between an average number (N) of single filaments of carbon fibers (A) and a springback ratio.

The springback ratio of a shaped product tends to be decreased with increasing an average number (N) of single filaments of the carbon fibers (A) as shown in FIG. 2. Particularly, in the case where an average number (N) of single filaments is 4,000, the springback ratio is about 200%.

In Examples and Comparative Examples, the average number (N) of single filaments was 8,200 at a maximum, but it is presumed that the springback ratio converges about 200% even though the average number (N) of single filaments is more than 8,200.

In the case of increasing the fiber volume content ratio and adjusting to 50 vol % or more, if the springback ratio of fibers is about 200%, the thickness of a shaped product nearly equals to the thickness of a random mat from which restraint of a thermoplastic resin is removed (see the formulae (9) and (10)).

Therefore, when the average number (N) of single filaments of the carbon fibers (A) is 4,000 or more, the springback ratio is about 200%. As a result, the bulk density can be larger than that of a random mat utilizing carbon fibers having an average number (N) of single filaments of smaller than 4,000, and a pressure applied for increasing a bulk density when molding can be reduced, and additionally, breakage of fibers during molding can be reduced and a fiber length in a shaped product can be maintained.

[Fiber Volume Content Ratio]

Figure 3:
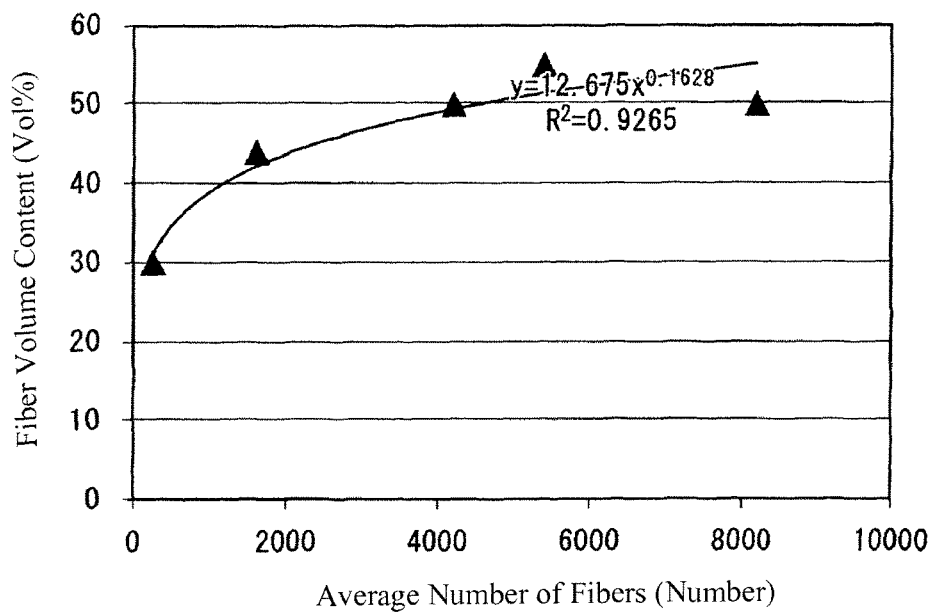
FIG. 3 is a view showing the relationship between an average number of fibers in carbon fiber bundles and a fiber volume content ratio.

FIG. 3 is a view showing the relationship between an average number (N) of single filaments of the carbon fibers (A) and a fiber volume content ratio.

From FIG. 3, when the average number (N) of single filaments of the carbon fibers (A) is 4,200 or more, the fiber volume content ratio can be 50 Vol % or more, and a good shape product having less thickness irregularity at the ends can be obtained. Furthermore, from Table 1, when the average number (N) of single filaments of the carbon fibers (A) is 4,200 or more, the fiber volume content ratio and flexural strength are higher than those of Comparative Examples 1 and 2 in which the average numbers (N) of single filaments are 240 and 1,600, respectively.

The reason for this is considered as follow.

As described in the item of the springback ratio, the springback ratio is enhanced as the average number (N) of single filaments constituting the carbon fibers (A) is lowered. From this fact, when molding a random mat, other than a pressure for impregnating carbon fibers with a molten thermoplastic resin (hereinafter sometimes referred to as a "molten resin"), a pressure for suppressing springback of a random mat (carbon fiber mat) is required.

For this reason, if a molding pressure when molding a random mat is constant, it is difficult to make a random mat have a desired molding thickness as the springback (ratio) is large, and it is considered to be difficult to obtain a random mat having high fiber volume content ratio. Furthermore, in the case of increasing a molding pressure, a mat having large springback ratio causes breakage of many fibers, and it is considered to be difficult to sufficiently maintain a fiber length of carbon fibers in a shaped product. Therefore, when the average number (N) of single filaments is 4,200 or more, a springback ratio is small and it is considered that high fiber volume content ratio and high mechanical characteristics are obtained.

[Carbon Fibers (A)]

(1) Average Number (N) of Single Filaments

The average number (N) of single filaments of the carbon fibers (A) is preferably $2.0 \times 10^5/D^2$ or more from the standpoint of springback. The average number (N) of single filaments of the carbon fibers (A) is preferably $2.0 \times 10^5/D^2$ or more from the standpoint of fiber volume content ratio.

The average number (N) of single filaments of the carbon fibers (A) is preferably less than $8.0 \times 10^5/D^2$ from the standpoint of variation of mechanical characteristics. The reason for this is that a random mat is manufactured by randomly spraying carbon fiber bundles, but where the number of carbon fibers constituting one bundle of the carbon fibers (A) is increased, variation of mechanical characteristics occurs between a (fiber-rich) site on which carbon fibers were sprayed and a (resin-rich) site on which carbon fibers were not sprayed, and therefore it is difficult to develop strength.

Furthermore, the average number (N) of single filaments of the carbon fibers (A) is preferably in the numerical range described before from the standpoint of mechanical characteristics. The reason for this is that a shaped product having high flexural strength can be surely obtained under low molding pressure as shown in Examples 1 to 3.

(2) Ratio

It is considered that when the average number (N) of single filaments of the carbon fibers (A) is $2.0 \times 10^5/D^2$ or more, the springback ratio can be decreased and good shaped product can be obtained even under low molding pressure. In other words, in the case of the carbon fibers (A) having an average single filament diameter of 7 μm, the springback ratio is small as the ratio of the carbon fibers (A) of the average number (N) of single filaments of 4,000 or more to the total amount of carbon fibers is increased, and a shaped product can be obtained under low molding pressure.

However, when the ratio of the carbon fibers (A) to the total amount of fibers is 100%, mechanical characteristics tend to be decreased as in the random mat using chopped strands of Patent Document 1 described in the conventional art.

It is one of the characteristics of the random mat according to the present embodiment to contain the carbon fibers (B) containing carbon fibers constituted by single fibers and carbon fibers of smaller than a critical fiber number, other than the carbon fibers (A). By this, the carbon fibers (B) are incorporated in the carbon fibers (A) sprayed, and the carbon fibers (B) can be arranged in a resin-rich portion, and as a result, decrease of mechanical characteristics can be suppressed.

From this fact, it says that in the carbon fibers constituting the random mat, when the carbon fibers (A) in which an average number (N) of single filaments is $2.0 \times 10^5/D^2$ or more are 99% or less to the total amount of fibers, a shaped product having high mechanical characteristics can be obtained under low molding pressure.

In Examples 1 to 3, the average number (N) of single filaments of the carbon fibers (A) is $2.0 \times 10^5/D^2$ or more, and the proportion of the carbon fibers (A) to the total amount of fibers in the mat is from 70 to 90%. By this, as shown in Table 1, the springback ratio can be decreased, and very high flexural strength is obtained.

On the other hand, in Comparative Example 1, the springback ratio is 1,430%, which is extremely high as compared with Examples. Furthermore, in Comparative Example 1, the fiber volume content ratio is 30 Vol %, and is low as compared with Examples. The reason for this is considered that because the average number (N) of single filaments constituting the carbon fibers (A) is smaller than $2.0 \times 10^5/D^2$ and the proportion of the carbon fibers (A) to the total amount of fibers of the mat is small as 35%, a bulk density was extremely decreased as in the random mat using reinforcing fibers in a single filament form of Patent Document 2 described in the conventional art.

Therefore, in the random mat according to the present embodiment, it is one of the characteristics to contain carbon fibers (B) containing single fibers and carbon fibers comprising carbon fibers smaller than a critical fiber number, other than the carbon fibers (A), but it is considered that the proportion of the carbon fibers (A) to the total amount of fibers of the mat is required to be 40% or more.

In Comparative Example 1, the average number (N) of single filaments of the carbon fibers (A) is $1.2 \times 10^4/D^2$ and is considerably smaller than the average number (N) of single filaments in Example 1. Considering this, in the case where the average number (N) of single filaments is larger than $2.0 \times 10^5/D^2$, if the carbon fibers (A) are contained in an amount of 40% or more in the proportion to the total amount of fibers in the mat, a bulk density is high, and it is considered that good shaped product is obtained even in the case of increasing the fiber volume content ratio.

In Comparative Example 2, the springback ratio is 450%, which is high as compared with Examples. Furthermore, in Comparative Example 2, the proportion of the carbon fibers (A) to the total amount of fibers of the mat is 53%, and this is slightly low as compared with Examples. In Comparative Example 2, the fiber volume content ratio is 44 Vol % and the flexural strength is 520 MPa, and those are good results as compared with Comparative Example 1.

However, in the shaped product obtained, fibers (random mat) cannot be sufficiently charged up to the ends, and there is a concern that moldability is deteriorated when the fiber volume ratio is increased.

In Comparative Example 2, the average number (N) of single filaments of the carbon fibers (A) is $7.8 \times 10^4/D^2$ and this is smaller than the average number (N) of single filaments in Example 1. Considering this, in the case where the average number (N) of single filaments is larger than $2.0 \times 10^5/D^2$, if the carbon fibers (A) are contained in an amount of 50% or more in the proportion to the total amount of fibers in the mat, it is considered that a shaped product having higher bulk density and higher fiber volume content ratio can be obtained.

Comparative Example 3

A random mat having a thickness of about 2 mm, in which carbon fibers having an average fiber length of 16 mm and a polycarbonate power were mixed was obtained by the following materials, apparatuses and operations. This random mat was heated by a press apparatus heated to 300° C. for 5 minutes under a pressure of 2.0 MPa to obtain a plate-like shaped product having a thickness of 0.8 mm. This shaped product comprises 100 Vol % of carbon fibers having a single filament number of 24,000 as carbon fibers, unimpregnated portion of a resin was confirmed in an overlapped portion of many carbon fibers, and the back side was seen through in a coarse portion of the carbon fibers. Thus, the shaped product had a problem to use.

<Material>

Carbon fiber TENAX (registered trademark) strand STS 40-24KS (single filament diameter: 7 μm, tensile strength: 4,000 MPa)) manufactured by Toho Tenax Co., Ltd. was used as carbon fibers.

Polycarbonate "PANLITE" (registered trademark) L-1225L pellets, manufactured by Teijin Chemicals Ltd. were frozen and crushed, and further classified with 20 mesh and 30 mesh to obtain a powder having an average particle diameter of about 1 mm, and the powder was used as the thermoplastic resin of the matrix resin.

<Apparatus>

A rotary cutter having cemented carbide knives (no fiber separating apparatus) was used as a cutting apparatus. The knives were arranged in a circumferential direction on the rotary cutter at 16 mm pitches.

An apparatus in which a transport pipe having small holes is arranged as an opening apparatus just under the rotary cutter and a compressor is connected to the transport pipe such that compressed air can be sent from the small holes was used as an opening apparatus. Furthermore, a taper tube was welded to a lower part of the transport pipe. A structure in which a matrix resin is supplied from a side surface of the taper tube was constituted, a table movable in XY directions and having an air-permeable top board was arranged at a lower part of an exit of the taper tube, and a blower was arranged at a lower part of the table, so that a mixture of carbon fibers sprayed from the taper tube and a matrix resin could be suctioned by the blower.

<Operation>

The carbon fibers were cut by the rotary cutter to form strand pieces. The strand pieces were mixed with a matrix resin by the taper tube through the transport pipe, and the resulting mixture was sprayed on the table while suctioning with the blower. Thus, a random mat was obtained. In this case, a pressure when sending compressed air from the small holes of the transport pipe was 0 MPa, that is, compressed air was not sent, a supply amount of the carbon fibers was 600 g/min, and a supply amount of the matrix resin was 500 g/min.

Example 4

A shaped product having a fiber volume content ratio of 50% and a thickness of 3.0 mm is obtained by conducing the same operations as in Example 1, except that a polybutylene terephthalate resin (manufactured by Polyplastics Co., Ltd., DURANEX (registered trademark) 700FP: melting point 230° C., thermal decomposition temperature 300° C.) is used as a thermoplastic resin that is a matrix resin and a temperature of a press machine when molding a random mat is 260° C. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, $E\delta$ value is calculated, and it confirms that the $E\delta$ value is less than 2, that is, the shaped product is isotropic.

Example 5

A shaped product having a fiber volume content ratio of 50% and a thickness of 3.0 mm is obtained by conducing the same operations as in Example 1, except that a polyphenylene sulfide resin (melting point 285° C.) is used as a thermoplastic resin that is a matrix resin and a temperature of a press machine when molding a random mat is 320° C. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, $E\delta$ value is calculated, and it confirms that the $E\delta$ value is less than 2, that is, the shaped product is isotropic.

Example 6

A shaped product having a fiber volume content ratio of 50% and a thickness of 3.0 mm is obtained by conducing the same operations as in Example 1, except that a polypropylene resin (polypropylene manufactured by Prime Polymer Co., Ltd.: PRIME POLYPRO J108M, melting point 170° C.) is used as a thermoplastic resin that is a matrix resin and a temperature of a press machine when molding a random mat is 230° C. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, $E\delta$ value is calculated, and it confirms that the $E\delta$ value is less than 2, that is, the shaped product is isotropic.

Example 7

A shaped product having a fiber volume content ratio of 50% and a thickness of 3.0 mm is obtained by conducing the same operations as in Example 1, except that a PA (nylon) 66 fiber (polyamide 66 fiber manufactured by Asahi Kasei Fibers Corporation: T5 Nylon, melting point 260° C., fineness 1,400 dtex) dry-cut is used as a thermoplastic resin that is a matrix resin and a temperature of a press machine when molding a random mat is 300° C. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, Eδ value is calculated, and it confirms that the Eδ value is less than 2, that is, the shaped product is isotropic.

Example 8

A shaped product having a fiber volume content ratio of 50% and a thickness of 3.0 mm is obtained by conducting the same operations as in Example 1, except that a syndiotactic polystyrene resin (melting point 270° C.) is used as a thermoplastic resin and a temperature of a press machine when molding a random mat is 300° C. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, Eδ value is calculated, and it confirms that the Eδ value is less than 2, that is, the shaped product is isotropic.

Example 9

<Use of Large Tow Carbon Fiber>

As carbon fibers, PAN-based large tow carbon fibers having a single filament number of 60,000 prepared by the method of Example 1 of JP-A-2012-188781 and being attached thereto 1.5% by weight of polyoxyethylene oleyl ether as sizing agents are used, and the carbon fibers are widened into a width of 60 mm. The widened strand is separated so as to be divided into 12 equal parts in a strand width direction. Thereafter, operations are conducted in the same manner as in Example 1 to obtain a random mat having the same opening indexes of carbon fibers as in Example 1 of the present application, and a shaped product having a fiber volume content ratio of 50% and a thickness of 3.0 mm is obtained from the random mat by the same operations as in Example 1. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, Eδ value is calculated, and it confirms that the Eδ value is less than 2, that is, the shaped product is isotropic.

Example 10

<Carding Opening>

As carbon fiber, PAN-based large tow carbon fiber strand having a single filament number of 60,000 prepared by the method of Example 1 of JP-A-2012-188781 and being attached thereto 1.5% by weight of polyoxyethylene oleyl ether as sizing agents are used, and the carbon fibers are widened into a width of 60 mm. The widened strand is separated so as to be divided into 12 equal parts in a strand width direction, cut into a fiber length of 20 mm, and introduced in a carding apparatus. In this case, carding conditions are adjusted such that carbon fibers after treatment satisfy the opening indexes of Example 1, and a carbon fiber mat having a fiber areal weight of 280 g/m² is formed. A longitudinal direction of the carbon fiber mat is 0°, and eight carbon fiber mats are layered so as to be (0°/+45°/−45°/90°). In layering, a nylon 6 resin film as a matrix resin is layered on each layer of the carbon fiber mats such that a volume ratio between the carbon fibers and the nylon 6 is 50:50, and the whole is sandwiched with stainless steel plates, and hot pressed for 20 minutes while applying a pressure of 2 MPa at 280° C. The layered boy is then cooled to 50° C. in a pressurized state to obtain a flat plate-like shaped product having a thickness of 2.5 mm of a carbon fiber composite material. Regarding this shaped product, thickness evaluation is conducted, an average thickness at a central part and an average thickness at the ends (four places) each are about 2.5 mm, and it is confirmed that the random mat is equally (thickness is uniform) and sufficiently charged up to the ends of a mold cavity when molding. In this shaped product, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, Eδ value is calculated, and it confirms that the Eδ value is less than 2, that is, the shaped product is isotropic.

Example 11

<Wet Paper-Making>

As carbon fiber, PAN-based large tow carbon fiber strand having a single filament number of 60,000 is prepared by the method of Example 1 of JP-A-2012-188781. A bisphenol A type epoxy resin (water-insoluble sizing agent) in an amount of 1.0% by weight and polyoxyethylene oleyl ether (water-soluble sizing agent) in an amount of 0.75% by weight are attached as sizing agents to the carbon fiber strand. In this case, the treatment is conducted such that the bisphenol A type epoxy resin is attached to partial carbon fibers constituting the carbon fiber strand and the polyoxyethylene oleyl ether is attached to other partial carbon fibers. The carbon fiber strand having those sizing agents attached thereto is widened into a width of 60 mm, divided into 12 equal parts in a strand width direction, and cut into 8.0 mm by a cartridge cutter to form strand pieces.

PA66 fiber (T5 Nylon manufactured by Asahi Kasei Fibers Corporation, 1,400 dtex) as a thermoplastic resin that is a matrix resin is cut into 2.0 mm by a cartridge cutter to obtain PA66 fiber pieces.

100 liters of a dispersion medium including water and a surfactant (manufactured by Nacalai Tesque, Inc., polyoxyethylene lauryl ether (trade name), concentration 0.1% by weight) is prepared, 53 g of the strand pieces and 35 g of the PA66 fiber pieces are introduced in the dispersion medium to obtain a dispersion. Stirring is extremely lightly conducted for a few minutes such that opening of strand pieces in the dispersion does not completely proceed until all of the strand pieces becomes single fiber filaments, but the opening indexes of carbon fibers reach nearly the same opening indexes as in Example 1. The dispersion is poured in a large-sized square type sheet machine (manufactured by Kumagai Riki Kogyo Co., Ltd., No. 2553-I (trade name)) having a paper-making surface of a length of 400 mm and a width of 400 mm, followed by suctioning and defoaming. Thus, a random mat having a length of 400 mm and a width of 400 mm is obtained. In this case, when supplying the dispersion to a filtration surface, a discharge part moves front/back and right/left to the filtration surface, so that carbon fibers and the like are not aligned in a specific direction. The random mat is dried at a temperature of 80° C. for 24 hours under vacuum.

Using a stacked body of 8 random mats obtained, operations are conducted in the same manner as in Example 2, except that the temperature when impregnating the carbon fibers with the resin and the temperature when obtaining a shaped product by a press machine are all 300° C., and a shaped product having a fiber volume content ratio of 50% and a thickness of 3.0 mm is obtained.

Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, Eδ value is calculated, and it confirms that the Eδ value is less than 2, that is, the shaped product is isotropic.

Example 12

Carbon fiber "TENAX" (registered trade mark) UMS40-12K manufactured by Toho Tenax Co., Ltd. (single filament diameter: 5 μm, tensile strength: 4,600 MPa)) as carbon fibers is widened into a width of 7 mm. Operations are conducted in the same manner as in Example 3, except that wind velocity of compressed air when opening is adjusted, and a random mat having the same average fiber length (L) of carbon fiber bundles, proportion of the carbon fiber bundles (A) and average number (N) of fibers in the carbon fiber bundles (A) as in Example 3 is obtained. A shaped product having a fiber volume content ratio of 50% and a thickness of 3.0 mm is obtained from the random mat by the same operations as in Example 3. Regarding this shaped product, thickness evaluation is conducted, an average thickness at a central part and an average thickness at the ends (four places) each are about 3.0 mm, and it is confirmed that the random mat is equally (thickness is uniform) and sufficiently charged up to the ends of a mold cavity when molding. In this shaped product, a springback amount is about 0.6 mm, a springback ratio is about 200%, and flexural strength measured according to JIS K 7074-1988 is high value by that reinforcing effect by carbon fibers is sufficiently exhibited. A test piece in a standard direction and a test piece in a direction vertical to the standard direction are cut out of the shaped product, respectively, and tensile modulus of those test pieces is measured, Eδ value is calculated, and it confirms that the Eδ value is less than 2, that is, the shaped product is isotropic.

Example 13

A shaped product having a thickness 3.0 mm (sometimes called a primary shaped product) is obtained by conducting operations in the same manner as in Example 1. This shaped product is heated in a nitrogen atmosphere under the same conditions as in the measurement of the springback amount to obtain a reshaping base material having a thickness of about 3.6 mm. This reshaping base material is cut such that a charge rate as a prepreg to a mold is 90%. The reshaping base material cut is arranged in a press machine heated to 280° C., and molded under a molding pressure of 2.0 MPa. Thus, a reshaped product of 3.0 mm is obtained. The uniformity of thickness, flexural strength and isotropy of the reshaped product and opening indexes of the carbon fibers contained are nearly the same level as those of the primary shaped product.

INDUSTRIAL APPLICABILITY

The random mat of the present invention can reduce a pressure applied when molding. As a result, large-sized molding facilities are not required even in a shaped product of fiber reinforced composite material having large area.

Furthermore, in the random mat of the present invention, high mechanical strength is obtained when a shaped product of fiber reinforced composite material is formed.

Furthermore, the carbon fiber mat of the present invention has low springback ratio and has excellent handling property when mixed with various matrixes.

Although the present invention has been described in detail and by reference to the specific embodiments, it is apparent to one skilled in the art that various modifications or changes can be made without departing the spirit and scope of the present invention.

This application is based on Japanese Patent Application No. 2013-133867 filed Jun. 26, 2013, the disclosure of which is incorporated herein by reference.

DESCRIPTION OF REFERENCE NUMERALS AND SIGNS

X, Y, Z Strand
M Random mat
11 Creel part
12 Widening unit
13 Separating unit
14 Cutting unit
15 Pipe body
17 Resin supply unit
18 Taper tube body
19 Support
20 Suction unit

The invention claimed is:
1. A random mat comprising:
carbon fibers having an average fiber length of from 3 mm to 100 mm; and
a thermoplastic resin,
wherein a fiber areal weight of the carbon fibers is from 25 to 10,000 g/m$^2$, a proportion of carbon fiber bundles (A) that are constituted by a number of single carbon filaments of 600 (μm)/D or more to a total amount of fibers in the random mat is from 40 Vol % to 99 Vol %, and an average number (N) of fibers in the carbon fiber bundles (A) satisfies the formula (2):

$$2.0\times10^5/D^2 < N < 8.0\times10^5/D^2 \qquad (2)$$

wherein D is an average fiber diameter (μm) of carbon fibers.

2. The random mat according to claim 1,
wherein an average thickness of the carbon fiber bundles (A) is 100 μm or less.

3. The random mat according to claim 1,
wherein an average fiber length of the carbon fibers is from 8 mm to 50 mm.

4. The random mat according to claim 1,
wherein said proportion of the carbon fiber bundles (A) to the total amount of carbon fibers in the random mat is from 60 Vol % to 90 Vol %.

5. The random mat according to claim 1,
wherein an amount of the thermoplastic resin in the random mat is from 20 parts by weight to 500 parts by weight per 100 parts by weight of the carbon fibers.

6. The random mat according to claim 1, comprising opened carbon fibers as the carbon fibers.

7. A shaped product of fiber reinforced composite material obtained by molding the random mat according to claim 1.

8. The shaped product of fiber reinforced composite material according to claim 7,
wherein an amount of the thermoplastic resin is from 20 parts by weight to 500 parts by weight per 100 parts by weight of the carbon fibers.

9. The shaped product of fiber reinforced composite material according to claim 7, comprising opened carbon fibers as the carbon fibers.

10. A carbon fiber mat comprising:
carbon fibers having an average fiber length of from 3 mm to 100 mm,
wherein the carbon fiber mat has a mat shape having a fiber areal weight of from 25 to 10,000 g/m²,
the carbon fibers in the carbon fiber mat include carbon fiber bundles (A) that are constituted by a number of single carbon filaments of 600 (μm)/D or more,
wherein a proportion of the carbon fiber bundles (A) that are constituted by a number of single carbon filaments of 600 (μm)/D or more to a total amount of fibers in the carbon fiber mat is from 40 Vol % to 99 Vol %, and
an average number (N) of single filaments in the carbon fiber bundles (A) satisfies the following formula (2):

$$2.0\times10^5/D^2 < N < 8.0\times10^5/D^2 \qquad (2)$$

wherein D is an average fiber diameter (μm) of carbon fibers.

11. The carbon fiber mat according to claim 10, comprising opened carbon fibers as the carbon fibers.

* * * * *